(12) United States Patent
Higa

(10) Patent No.: US 10,147,015 B2
(45) Date of Patent: Dec. 4, 2018

(54) IMAGE PROCESSING DEVICE, IMAGE PROCESSING METHOD, AND COMPUTER-READABLE RECORDING MEDIUM

(71) Applicant: NEC Corporation, Minato-ku, Tokyo (JP)

(72) Inventor: Kyota Higa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 17 days.

(21) Appl. No.: 15/306,166

(22) PCT Filed: Apr. 24, 2015

(86) PCT No.: PCT/JP2015/002240
§ 371 (c)(1),
(2) Date: Oct. 24, 2016

(87) PCT Pub. No.: WO2015/170461
PCT Pub. Date: Nov. 12, 2015

(65) Prior Publication Data
US 2017/0061231 A1    Mar. 2, 2017

(30) Foreign Application Priority Data

May 7, 2014    (JP) .................................. 2014-095959

(51) Int. Cl.
*G06T 9/00*    (2006.01)
*G06K 9/46*    (2006.01)
(Continued)

(52) U.S. Cl.
CPC ....... *G06K 9/4609* (2013.01); *G06K 9/00288* (2013.01); *G06K 9/623* (2013.01); *G06K 9/6211* (2013.01); *G06T 7/00* (2013.01)

(58) Field of Classification Search
CPC .............................................. G06K 9/00–9/82
See application file for complete search history.

(56) References Cited

U.S. PATENT DOCUMENTS 6,711,293 B1    3/2004 Lowe
7,027,624 B2    4/2006 Monden
(Continued)

FOREIGN PATENT DOCUMENTS

JP    2002-298141 A    10/2002
JP    2010-152543 A    7/2010
(Continued)

OTHER PUBLICATIONS

International Search Report for PCT Application No. PCT/JP2015/002240, dated Jun. 16, 2015.
(Continued)

*Primary Examiner* — Sean Motsinger

(57) ABSTRACT

Provided is an image processing device that can suppress deterioration in the accuracy of identifying a subject, even in cases where the shape of the subject in an image is deformed.
A feature amount calculation means 81 detects feature points from an image, and calculates, for each feature point, a local feature amount for the feature point on the basis of a peripheral region of said feature point, including said feature point. A correlation identifying means 82 specifies the correlation between feature points in a first image and feature points in a second image on the basis of the local feature amount of each feature point in the first image and the local feature amount of each feature point in the second image. A partial region detection means 83 detects, from one of the first image or the second image, partial regions each including a feature point in said image. A matching means 84 determines, for each partial region, whether or not a subject in the first image is identical with or similar to a subject in the second image on the basis of the feature point included in the partial region and a feature point corresponding to the feature point.

12 Claims, 27 Drawing Sheets

(51) Int. Cl.
*G06T 7/00* (2017.01)
*G06K 9/62* (2006.01)
*G06K 9/00* (2006.01)

(56) References Cited

U.S. PATENT DOCUMENTS

| | | | | |
|---|---|---|---|---|
| 9,798,955 | B2* | 10/2017 | Bao | G06K 9/6211 |
| 2002/0181782 | A1* | 12/2002 | Monden | G06K 9/6206 |
| | | | | 382/215 |
| 2004/0103101 | A1* | 5/2004 | Stubler | G06F 17/30259 |
| 2009/0080783 | A1* | 3/2009 | Hirohata | G06K 9/00463 |
| | | | | 382/218 |
| 2009/0154799 | A1* | 6/2009 | Tsukada | G06K 9/4652 |
| | | | | 382/165 |
| 2011/0081089 | A1* | 4/2011 | Mori | G06K 9/00281 |
| | | | | 382/218 |
| 2012/0117069 | A1* | 5/2012 | Kawanishi | G06K 9/00664 |
| | | | | 707/740 |
| 2014/0368689 | A1* | 12/2014 | Cao | G06K 9/52 |
| | | | | 348/222.1 |
| 2015/0161468 | A1* | 6/2015 | Higa | G06K 9/4676 |
| | | | | 382/199 |
| 2015/0339516 | A1* | 11/2015 | Yano | G06K 9/00281 |
| | | | | 382/118 |
| 2016/0292529 | A1* | 10/2016 | Matsuda | G06K 9/6204 |
| 2016/0379050 | A1* | 12/2016 | Tian | G06K 9/00281 |
| | | | | 382/118 |
| 2017/0061231 | A1* | 3/2017 | Higa | G06T 7/00 |
| 2017/0257596 | A1* | 9/2017 | Murata | H04N 5/915 |

FOREIGN PATENT DOCUMENTS

| | | |
|---|---|---|
| JP | 2013-218605 A | 10/2013 |
| WO | 2014/002554 A1 | 1/2014 |

OTHER PUBLICATIONS

English translation of Written opinion for PCT Application No. PCT/JP2015/002240.

* cited by examiner

IMAGE PROCESSING DEVICE, IMAGE PROCESSING METHOD, AND COMPUTER-READABLE RECORDING MEDIUM

This application is a National Stage Entry of PCT/JP2015/002240 filed on Apr. 24, 2015, which claims priority from Japanese Patent Application 2014-095959 filed on May 7, 2014, the contents of all of which are incorporated herein by reference, in their entirety.

TECHNICAL FIELD

The present invention relates to an image processing device, an image processing method, and a computer-readable recording medium.

BACKGROUND ART

To enable robust identification of objects (such as products, buildings, or prints, for example) in images even when a change in size or angle in image capturing or occlusion occurs, there have been proposed methods of detecting a number of distinctive points (feature points) in each image and extracting the feature amount of a local region around each feature point (local feature amount). As a representative of the methods, PTL 1 discloses an image processing device that uses SIFT (Scale Invariant Feature Transform) feature amounts.

Moreover, PTL 2 describes a detection device that uses a reference image and a search image to detect, in the search image, a target object included in the reference image. The detection device described in PTL 2 extracts multiple feature points from the target object in the reference image and calculates the local feature amount of each feature point. The detection device described in PTL 2 also sets a matching region in the search image and calculates the local feature amount of each local region included in the matching region. The matching region is set at the size equal to that of a reference region, which is the region of the target object in the reference region. The detection device described in PTL 2 calculates the degree of similarity by using local feature amounts obtained based on the reference image and the local feature amounts in the matching region set in the search image.

PTL 3 describes an image processing device that performs matching of objects. The image processing device described in PTL 3 extracts the local feature amount of each feature point included in a first image and also extracts the local feature amount of each feature point included in a second image. The image processing device described in PTL 3 performs clustering of the feature points included in the first image, on the basis of the positions of the feature points included in the first image, and determines, for each cluster, whether or not the objects are the same or similar, by using the local feature amounts of the group of feature points of the first image in the cluster and the local feature amounts of all the feature points of the second image.

CITATION LIST

Patent Literature

[PTL 1] U.S. Pat. No. 6,711,293
[PTL 2] Japanese Laid-open Patent Publication No. 2010-152543
[PTL 3] PCT International Publication No. WO 2014/002554

SUMMARY OF INVENTION

Technical Problem

As a common image processing device using the technique described in PTL 1 (referred to simply as a common image processing device below), considered may be the following image processing device. For example, the common image processing device detects a number of feature points from a first image and calculates a set of local feature amounts each obtained for the local region of each feature point (first local feature amount group) on the basis of the coordinate values, scale (size), and angle (direction) of the feature point, and similarly calculates a set of local feature amounts (second local feature amount group) on the basis of a second image. The common image processing device then associates similar feature points of the first image and the second image (referred to as of/in the images, below) with each other based on the distances between the local feature amounts in the first local feature amount group and the local feature amounts in the second local feature amount group. The feature points of the images associated with each other are referred to as corresponding points.

Thereafter, the common image processing device performs geometric validation on the corresponding points of the images on the basis of the positional relationship of the corresponding points, to thereby identify the same or similar objects in the images. Here, being similar means that, for example, the objects have a partial difference, only part of the object is included in each of or one of the images, or the objects are different in appearance between the images due to the difference in angle in capturing the images of the objects.

In the geometric validation, a geometric transformation model of the images that is estimated based on the positional relationship of the corresponding points, is used. The fundamental matrix, projective transformation matrix, or the like is used to obtain a geometric transformation model, and RANSAC (RANdom SAmple Consensus), which enables robust estimation, is used as a method of estimating a geometric transformation model. The common image processing device determines the corresponding points that match the geometric transformation model estimated by RANSAC as inliers while determining the other corresponding points as outliers. When the number of corresponding points determined as inliers is sufficiently large with respect to the number of corresponding points determined as outliers, it is considered that the estimated geometric transformation model is highly reliable. Hence, in this case, the common image processing device determines that the same or similar objects are included in the images.

The above-described common image processing device determines whether or not the images are the same or similar, on the basis of all the positional relationships of the corresponding points detected in the images. In this case, the following problem occurs. The pairs of the feature points of the first image and the feature points of the second image that matches the corresponding points include both correct pairs and incorrect pairs. In order to delete the incorrect corresponding points, the common image processing device verifies whether the relative positional relationship of each feature point of the first image and the relative positional relationship of each feature point of the second image are geometrically correct. When the object in one of the images has a change in shape, the relative positional relationships of the feature points are significantly different from each other, even if the feature amounts of the feature points are similar to each other. Therefore, in this case, the common image processing device fails to accurately determine whether the pair of the feature points are a correct pair or an incorrect pair. Hence, for example, when the object has a change in shape such as a case of the object being bent or dented, it is difficult to estimate a geometric transformation model of the corresponding points of the images, which causes a decrease of accuracy in identifying objects.

The detection device described in PTL 2 calculates the degree of similarity by using all the local feature amounts obtained from the reference image and all the local feature amounts in the matching region set in the search image. Hence, a similar problem to the above occurs.

The image processing device described in PTL 3 determines, for each cluster, whether or not the objects are the same or similar, by using the local feature amounts of the feature point group of the first image in the cluster and the local feature amounts of all the feature points in the second image. Hence, a similar problem to the above occurs.

In view of the above, the present invention mainly aims to provide an image processing device, an image processing method, and a computer-readable recording medium that are capable of suppressing a decrease of accuracy in identifying objects even when the object in an image has a change in shape.

Solution to Problem

An image processing device according to one aspect of the present invention includes a local feature amount calculation means that detects feature points in an image and calculates, for each of the feature points, a local feature amount of the feature point, based on a peripheral region of the feature point, the peripheral region including the feature point, a correlation identifying means that specifies, based on the local feature amount of each of the feature points of a first image and the local feature amount of each of the feature points of a second image, a correlation between the feature point of the first image and the feature point of the second image, a partial region detection means that detects partial regions including the feature points in an image of one of the first image and the second image, and a matching means that determines, for each of the partial regions, whether or not an object in the first image and an object in the second image are the same or similar based on the feature points included in the partial region and the feature points corresponding to the respective feature points.

An image processing method according to one aspect of the present invention includes detecting feature points in an image and calculating, for each of the feature points, a local feature amount of the feature point, based on a peripheral region of the feature point, the peripheral region including the feature point, identifying, based on the local feature amount of each of the feature points of a first image and the local feature amount of each of the feature points of a second image, a correlation between the feature point of the first image and the feature point of the second image, detecting partial regions including the feature points in an image of one of the first image and the second image, and determining, for each of the partial regions, whether or not an object in the first image and an object in the second image are the same or similar, based on the feature points included in the partial region and the feature points corresponding to the respective feature points.

A computer-readable recording medium according to one aspect of the present invention stores an image processing program for causing a computer to execute a local feature amount calculation process for detecting feature points from an image and calculating, for each of the feature points, a local feature amount of the feature point, based on a peripheral region of the feature point, the peripheral region including the feature point, a correlation identifying process for identifying, based on the local feature amount of each of the feature points of a first image and the local feature amount of each of the feature points of a second image, a correlation between the feature point of the first image and the feature point of the second image, a partial region detection process for detecting a partial region including each of the feature points in an image of one of the first image and the second image, and a matching process for determining, for each of the partial regions, whether or not an object in the first image and an object in the second image are the same or similar, based on the feature point included in the partial region and the feature point corresponding to the feature point.

Advantageous Effects of Invention

According to the present invention, it is possible to suppress a decrease of accuracy in identifying objects even when the object in an image has a change in shape.

DESCRIPTION OF EMBODIMENTS

Figure 27:
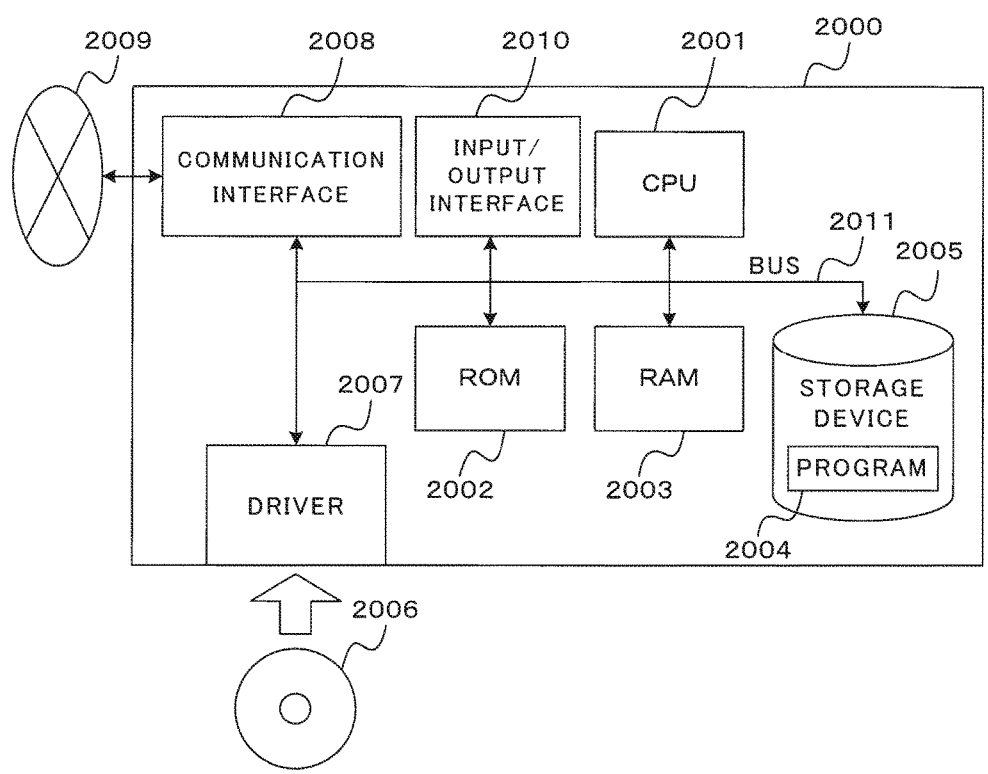
FIG. 27 is a diagram illustrating an example of a computer that implements the image processing device according to each of the example embodiments of the present invention.

In the following explanation, reference signs included in the drawings are assigned for convenience to provide assistance in the understanding and are not intended to limit the contents of the invention. In each example embodiment of the present invention, each component of each device indicates a functional-unit block. Each component of each device may be implemented by an arbitrary combination of a computer 2000 and a program as those illustrated in FIG. 27, for example. The computer 2000 includes the following configuration as an example.

CPU (Central Processing Unit) 2001
ROM (Read Only Memory) 2002
RAM (Random Access Memory) 2003
Program 2004 loaded into the RAM 2003
Storage device 2005, such as a semiconductor memory or a hard disk, that stores the program 2004
Driver 2007 that performs reading and writing from and to a recording medium 2006, such as a magnet recording medium or an optical recording medium
Communication interface 2008 that is connected to a network 2009
Input/output interface 2010 that inputs and outputs data
Bus 2011 that interconnects the components There are various modified examples of a manner of implementing each device. For example, each device may be implemented as a dedicated device. Alternatively, each device may be implemented by a combination of multiple devices.

Figure 1:
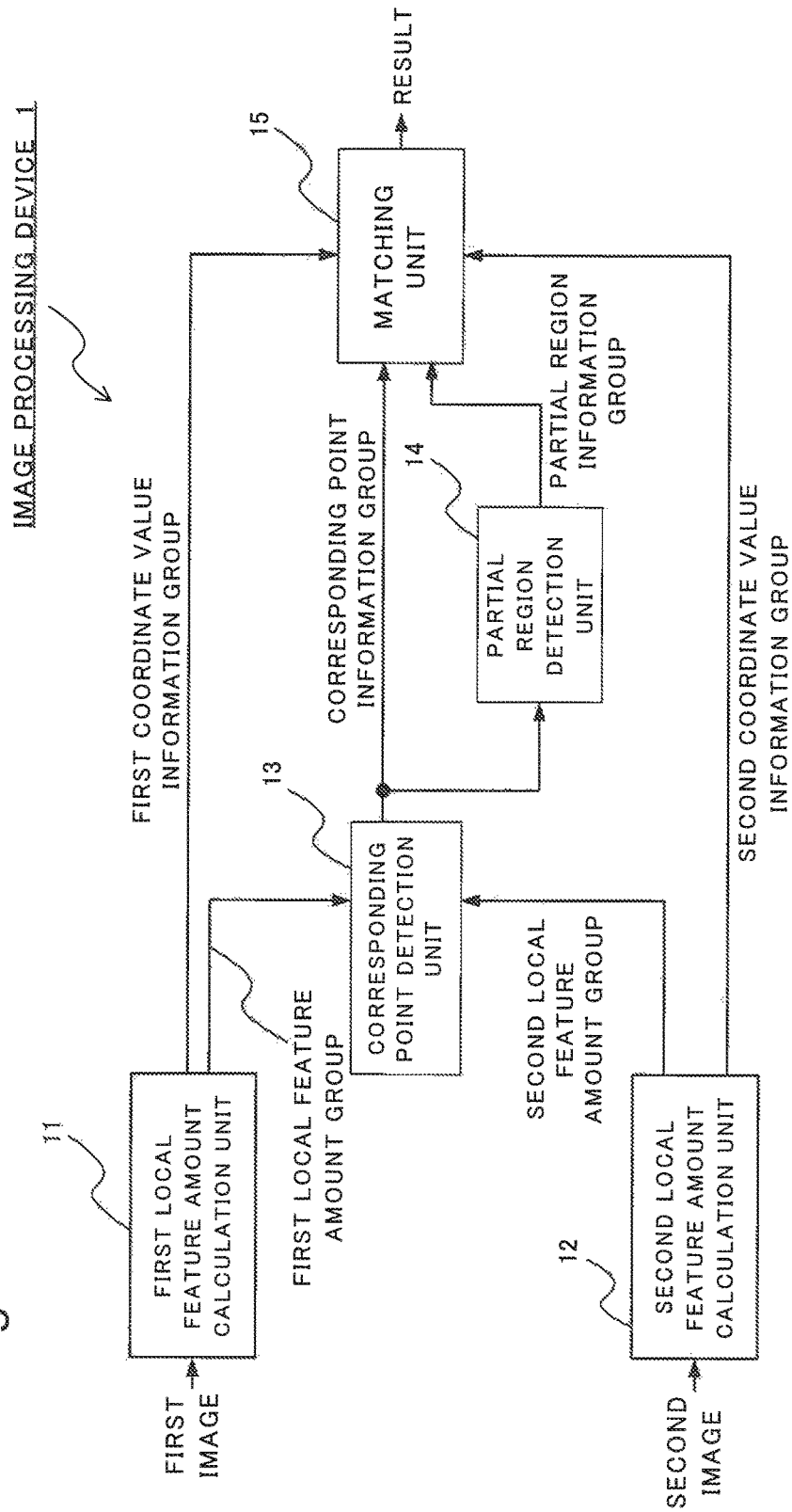
FIG. 1 is a block diagram illustrating an overview of an image processing device according to the present invention.

First, an overview of the present invention is described. FIG. 1 is a block diagram illustrating an overview of an image processing device of the present invention. The image processing device 1 of the present invention includes a first local feature amount calculation unit 11, a second local feature amount calculation unit 12, a corresponding point detection unit 13, a partial region detection unit 14, and a matching unit 15.

The first local feature amount calculation unit 11 detects one or more feature points in a first image. The first local feature amount calculation unit 11 then calculates, for each of the detected feature points, the local feature amount of the feature point, on the basis of a peripheral region including the feature point. A set of local feature amounts corresponding to the respective feature points detected in the first image is referred to as a first local feature amount group.

The second local feature amount calculation unit 12 detects one or more feature points in a second image. The second local feature amount calculation unit 12 then calculates, for each of the detected feature points, the local feature amount of the feature point, on the basis of a peripheral region including the feature point. A set of local feature amounts corresponding to the respective feature points detected in the second image is referred to as a second local feature amount group.

The corresponding point detection unit 13 calculates corresponding point information indicating a correlation between the feature point corresponding to the local feature amounts included in the first local feature amount group (a feature point of the first image) and the feature point corresponding to the local feature amounts included in the second local feature amount group (a feature point of the second image). Specifically, the corresponding point information is information indicating the feature point of the second image to which one of the feature points of the first image corresponds. A set of pieces of corresponding point information is referred to as a corresponding point information group.

The partial region detection unit 14 detects a region including a corresponding point of the first image, as a partial region, on the basis of the corresponding point information group. The partial region is detected in the first image. The partial region detection unit 14 may detect multiple partial regions. A single partial region may include multiple corresponding points of the first image. Information indicating the corresponding point of the first image that is included in the partial region and the corresponding point of the second image that forms a pair with the corresponding point of the first image is referred to as partial region information. Since multiple corresponding points of the first image may be included in a single partial region as described above, multiple pieces of partial region information may be produced for a single partial region. A set of pieces of partial region information obtained from a single partial region is referred to as a partial region information group. The partial region detection unit 14 generates the partial region information group for each of the detected partial regions.

The matching unit 15 compares, for each partial region, the first image and the second image on the basis of the partial region information group output by the partial region detection unit 14.

Each partial region is a region corresponding to part of the first image. When such partial regions are considered, the relative positional relationships of each of the points of the first image that are included in each partial region do not change significantly. Hence, the first image and the second image being compared by the image processing device 1 for each partial region as described above enables highly accurate identification of an object in the first image and an object in the second image even when the objects have a change in shape in the images.

The first local feature amount calculation unit 11, the second local feature amount calculation unit 12, the corresponding point detection unit 13, the partial region detection unit 14, and the matching unit 15 may be implemented, for example, by a CPU of a computer that operates in accordance with an image processing program. In this case, the CPU may read the image processing program from a recording medium in which the program is stored, and operate as each of the above-described components in accordance with the program. The recording medium storing the program may be a non-transient recording medium, such as a semiconductor memory, a hard disk drive, a magnetic recording medium, or an optical recording medium. This respect also applies to each example embodiment to be described later.

Example embodiments of the present invention are described below with reference to the drawings.

Example Embodiment 1

Figure 2:
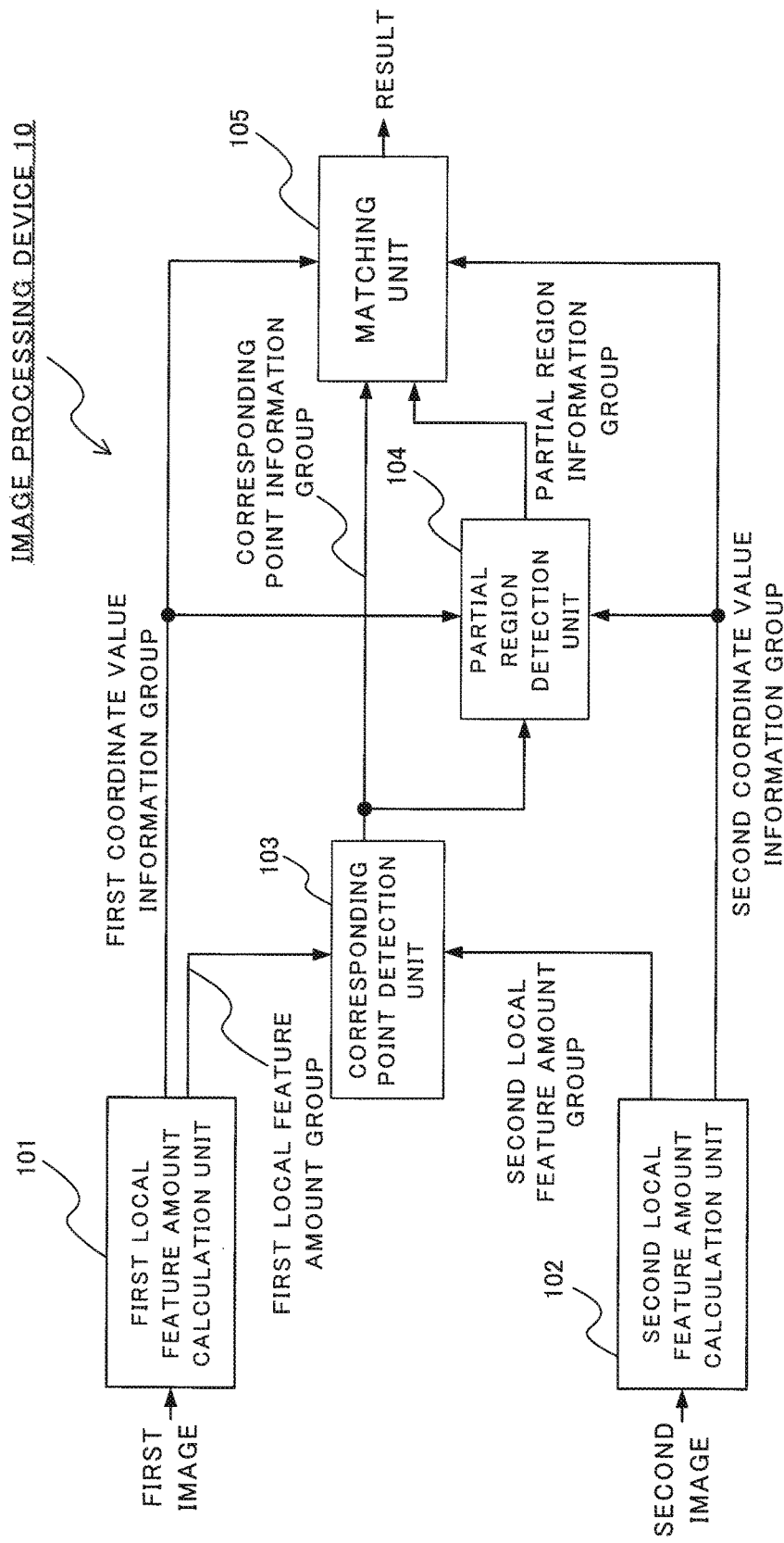
FIG. 2 is a block diagram illustrating an example of an image processing device according to a first example embodiment of the present invention.

FIG. 2 is a block diagram illustrating an example of an image processing device according to a first example embodiment of the present invention. An image processing device 10 of the first example embodiment includes a first local feature amount calculation unit 101, a second local feature amount calculation unit 102, a corresponding point detection unit 103, a partial region detection unit 104, and a matching unit 105. Note that the image processing device 10 of this example embodiment is not limited to the configuration illustrated in FIG. 2.

The first local feature amount calculation unit 101 detects one or more feature points in a first image and outputs a first coordinate value information group, which is a set of coordinate values of the feature points, to the partial region detection unit 104 and the matching unit 105. In the first coordinate value information group, the coordinate values of each feature point are associated with the index number of the feature point.

The first local feature amount calculation unit 101 also calculates, for each feature point, a local feature amount on the basis of the coordinate values of the feature point, and outputs the first local feature amount group, which is a set of calculated local feature amounts, to the corresponding point detection unit 103. Here, the first local feature amount calculation unit 101 may calculate a local feature amount by using information on the scale or direction of a region for which the local feature amount is being calculated, in addition to the coordinate values of the feature point, for example. A scale is represented in value and may therefore be referred to as a scale value. In the first local feature amount group, the local feature amount of each feature point is associated with the index number of the feature point.

The scale value of each feature point is, for example, size information associated with the feature point, and the value is calculated on the basis of the image in a peripheral region including the feature point. The scale value of the feature point preferably has characteristics that, for example, when the peripheral region including the feature point is enlarged or reduced, the value changes accordingly. The change in scale value according to enlargement or reduction of the peripheral region may be a linear change, non-linear change, logarithmic change, or exponential change, for example.

The direction information of each feature point is, for example, information on the direction (angle) associated with the feature point, and the value is calculated on the basis of the image of the peripheral region including the feature point. The direction information of the feature point preferably has characteristics that, for example, when the image of the peripheral region including the feature point rotates, the angle also rotates accordingly. The first local feature amount calculation unit 101 may calculate, as direction information of the feature point, the direction in which the magnitude of luminance gradient is the maximum in the peripheral region including the feature point, for example.

Figure 3:
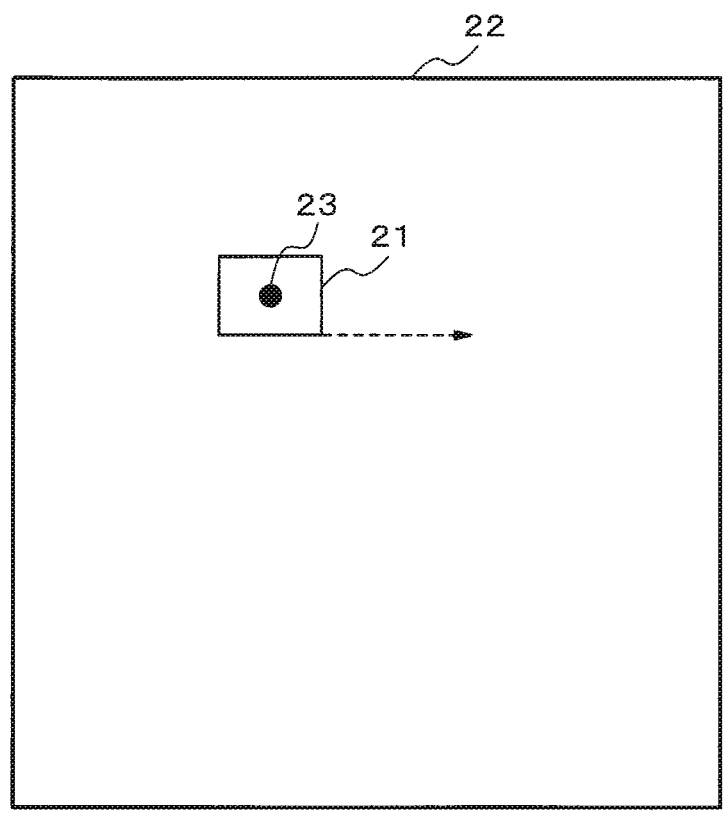
FIG. 3 is an explanatory drawing illustrating a rectangle including a feature point.
Figure 4:
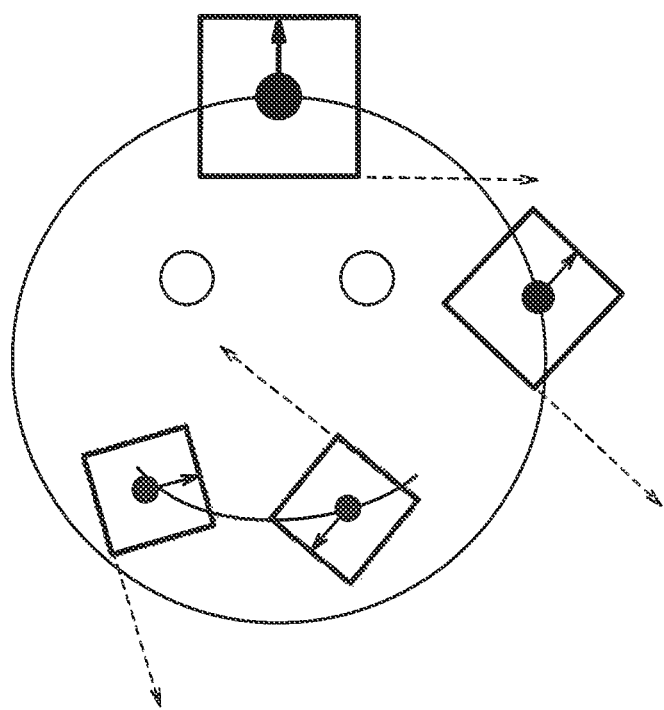
FIG. 4 is an explanatory drawing illustrating examples of a rotated rectangle.

An example of calculation of a local feature amount is described below. The first local feature amount calculation unit 101 sets a rectangle that includes a feature point and has a size depending on the scale. FIG. 3 is an explanatory diagram illustrating a rectangle including a feature point. A rectangle 21 in an initial state is set so that the rectangle 21 includes a feature point 23 at the center and the sides of the rectangle 21 are parallel with the respective sides of an image 22. In this example, the explanation is given by assuming that both the first image and the second image also have rectangular shapes. The rectangle 21 has a reference direction. The reference direction is indicated in a dashed line in FIG. 3. The first local feature amount calculation unit 101 analyzes the rectangle 21 which is set to identify the direction in which the magnitude of the luminance gradient is the maximum and rotate the rectangle 21 which is set according to the direction. Examples of a rotated rectangle are presented in FIG. 4. In FIG. 4, each arrow in a solid line indicates the direction identified as that in which the magnitude of the luminance gradient is the maximum. For example, the first local feature amount calculation unit 101 may simply rotate the rectangle 21 so that the direction in which the magnitude of the luminance gradient is the maximum and the reference direction form a predetermined angle (90° in the example illustrated in FIG. 4). By accompanying the rotation of the rectangle, the reference direction of the rectangle also rotates (refer to FIG. 4). The first local feature amount calculation unit 101 recalculates the magnitude of the luminance gradient in the rectangle for each predetermined angle (for example, each of 0°, 90°, and the like) from the reference direction by assuming that the reference direction of the rotated rectangle as the 0-degree direction. The magnitude of the luminance gradient calculated for each predetermined angle from the reference direction is the local feature amount corresponding to the feature point. The first local feature amount calculation unit 101 calculates a local feature amount for each detected feature point. Note that a local feature amount may be calculated by a different calculation method.

The second local feature amount calculation unit 102, similarly to the first local feature amount calculation unit 101, detects feature points in the second image and outputs a second coordinate value information group, which is a set of coordinate values of the feature points, to the partial region detection unit 104 and the matching unit 105. Note that, in the second coordinate value information group, the coordinate values of each feature point are associated with the index number of the feature point.

Through similar operations to those by the first local feature amount calculation unit 101, the second local feature amount calculation unit 102 calculates a local feature amount for each feature point and outputs a second local feature amount group, which is a set of calculated local feature amounts, to the corresponding point detection unit 103. In the second local feature amount group, the local feature amount of each feature point is associated with the index number of the feature point.

A configuration including a storage means (omitted in the drawings) storing in advance information including the coordinate values and local feature amount of each feature point of the second image that are identified in advance, may be employed. This respect applies to all the example embodiments of the present invention. In this case, the second local feature amount calculation unit 102 does not need to be provided. In this case, the partial region detection unit 104 and the matching unit 105 may read the second coordinate value information group from the storage means, and the corresponding point detection unit 103 may read the second local feature amount group from the storage means.

The corresponding point detection unit 103 generates pieces of corresponding point information so that the number of the pieces of corresponding point information satisfies a predetermined condition, by using the first local feature amount group output by the first local feature amount calculation unit 101 and the second local feature amount group output by the second local feature amount calculation unit 102. For example, the above-described predetermined condition may be one that the number of pieces of corresponding point information exceeds a predetermined threshold.

Specifically, the corresponding point detection unit 103 calculates an inter-local-feature-amount distance between one of the feature points of the first image and one of the feature points of the second image. The corresponding point detection unit 103 then generates pieces of corresponding point information each indicating the correlation between the feature point of the first image and the feature point of the second image so that the number of pieces of corresponding point information satisfies the predetermined condition, on the basis of the calculated inter-local-feature-amount distances. The corresponding point information may be represented by using the pair of the index number of the feature point of the first image and the index number of the feature point of the second image. The index number of the feature point of the first image is denoted by the reference sign q, and the index number of the feature point of the second image is denoted by the reference sign p, below. In other words, the corresponding point information may be represented in the form of (q, p). The corresponding point detection unit 103 sequentially assigns index numbers to pieces of corresponding point information. The index number of a piece of corresponding point information is denoted by the reference sign k, below. For example, assume that the q1-th feature point of the first image and the p1-th feature point of the second image are corresponding to each other. In this case, when corresponding point information (q1, p1) is k1-th piece of corresponding point information, the index number "k1" is assigned to (q1, p1).

The corresponding point detection unit 103 may calculate the Euclidean distance of a local feature amount as an inter-local-feature-amount distance. The corresponding point detection unit 103 may, for example, calculate the inter-local-feature-amount distance between one of the feature points of the first image and each of the feature points of the second image and identify the feature point of the second image having the smallest inter-local-feature-amount distance to the feature point of the first image, to determine the feature point of the second image corresponding to the feature point of the first image. There may be some feature points each of which has no correlation with any of the feature points of the other image. For example, the corresponding point detection unit 103 may determine whether there is a correlation, by using the ratio between the smallest inter-local-feature-amount distance and the second smallest inter-local-feature-amount distance as an evaluation criterion. Note that a method of detecting corresponding points is preferably determined as appropriate and is not limited to the above-described method.

The corresponding point detection unit 103 outputs a corresponding point information group, which is a set of calculated pieces of the corresponding point information, to the partial region detection unit 104 and the matching unit 105.

The partial region detection unit 104 detects regions including the corresponding points in the first image, as partial regions by using the first coordinate value information group output by the first local feature amount calculation unit 101, the second coordinate value information group output by the second local feature amount calculation unit 102, and the corresponding point information group output by the corresponding point detection unit 103. The partial region detection unit 104 detects partial regions so that the number of partial regions exceeds a number satisfying a predetermined condition (for example, detects partial regions so that the number of partial regions exceeds a predetermined threshold).

The partial region detection unit 104 then outputs, for each detected partial region, a set of pieces of information indicating corresponding point information in each of which one of the feature points of the first image included in the detected partial region is defined as a corresponding point, as a partial region information group, to the matching unit 105. For example, as information indicating a piece of corresponding point information, the index number k of the piece of corresponding point information may be used.

Specifically, the partial region detection unit 104 may, for example, divide the first image into analysis regions each having a predetermined size and consider each of the analysis regions as a partial region. The partial region detection unit 104 may then set, for each partial region, a set of index numbers k of the pieces of corresponding point information in each of which one of the feature points of the first image included in the partial region is indicated as a corresponding point, as a partial region information group. The shape of each analysis region may be rectangular or circular. Moreover, the region to be analyzed may be the entire image or part of the image. Part of the image may be a circumscribed rectangle of the group of corresponding points of the first image or may be a circle including the group of corresponding points of the first image therein. The size of each analysis region may be fixed or variable. Furthermore, adjacent analysis regions may overlap but do not need to overlap.

The partial region detection unit 104 may, for example, perform clustering on the corresponding points of the first image on the basis of the coordinate values of the corresponding points, and may consider each of the clusters as a partial region. In other words, the partial region detection unit 104 may determine, for each of the clusters, a region including the corresponding points of the first image that belong to the cluster, as the partial region. The partial region detection unit 104 may then set, for each of the partial region, a set of index numbers k of the pieces of corresponding point information in each of which one of the feature points of the first image included in the partial region is indicated as a corresponding point, as a partial region information group.

In the clustering of the corresponding points of the first image, when the distance between the coordinates of two of the corresponding points of the first image is small, the partial region detection unit 104 may employ such a method as to classify the two corresponding points into the same cluster. Whether the distance between the coordinates of two corresponding points is small may be determined, for example, depending on whether the distance is not larger than a predetermined threshold. The partial region detection unit 104 may calculate, as the distance between two corresponding points included in the first image, a Euclidean distance, a Mahalanobis distance, or a city block distance, for example.

In the clustering of the corresponding points of the first image, the partial region detection unit 104 may employ such a method as to calculate, for each of all the combinations of the corresponding points included in the first image, the distance between the corresponding points and to perform clustering of the corresponding points through graph cut of the calculated distances, for example.

In this case, the partial region detection unit 104 generates a graph having the corresponding points of the first image as nodes and the distances between the corresponding points of the first image as edges between the nodes, for example. For the graph cut, widely known normalized cut or the Markov Cluster algorithm may be used, for example.

In the clustering of the corresponding points of the first image, the partial region detection unit 104 may use the widely known k-means method or the Mean Shift method, for example.

The matching unit 105 determines whether or not the same or similar objects are included in the images, by using the first coordinate value information group output by the first local feature amount calculation unit 101, the second coordinate value information group output by the second local feature amount calculation unit 102, the corresponding point information group output by the corresponding point detection unit 103, and the partial region information group output by the partial region detection unit 104.

Specifically, the matching unit 105 may perform, for each of the partial region, geometric validation on the corresponding points of the images by using the coordinate values of the corresponding points included in the partial region, and determine whether or not the objects in the images are the same or similar, on the basis of the total number of the corresponding points each having geometric match, for example.

In the execution of geometric validation, the matching unit 105 may assume that the geometric relationship between the corresponding points of the images corresponds to similarity transformation and then estimate a geometric transformation model indicating the geometric relationship, by using a robust estimation method, for example. The matching unit 105 may then determine whether the pair of the corresponding point of the first image and the corresponding point of the second image match the estimated geometric transformation model. The matching unit 105 may employ, for example, RANSAC or the least-squares method as a robust estimation method. The matching unit 105 may employ, for example, affine transformation or projective transformation (homography) for the geometric relationship between the corresponding points of the images. Here, assume, for example, that two thresholds that satisfy T1<T2 are predetermined. For example, when the total number of pairs of corresponding points that match the estimated geometric transformation model is smaller than T1, the matching unit 105 determines that the objects in the images are neither the same nor similar. When the total number of pairs of corresponding points that match the estimated geometric transformation model is larger than or equal to T1 and smaller than T2, the matching unit 105 determines that the objects in the images are similar to each other. When the total number of pairs of corresponding points that match the estimated geometric transformation model is larger than or equal to T2, the matching unit 105 determines that the objects in the images are the same.

Alternatively, the matching unit 105 may determine whether or not the objects in the images are the same or similar, on the basis of the ratio between the number of pairs of the corresponding points each having geometric match and the number of pairs of the corresponding points each not having geometric match.

The first local feature amount calculation unit 101, the second local feature amount calculation unit 102, the corresponding point detection unit 103, the partial region detection unit 104, and the matching unit 105 may be implemented by a CPU of a computer that operates in accordance with an image processing program, for example. In this case, the CPU may read the image processing program from a recording medium storing the program and operate as each of the above-described components in accordance with the program.

Figure 5:
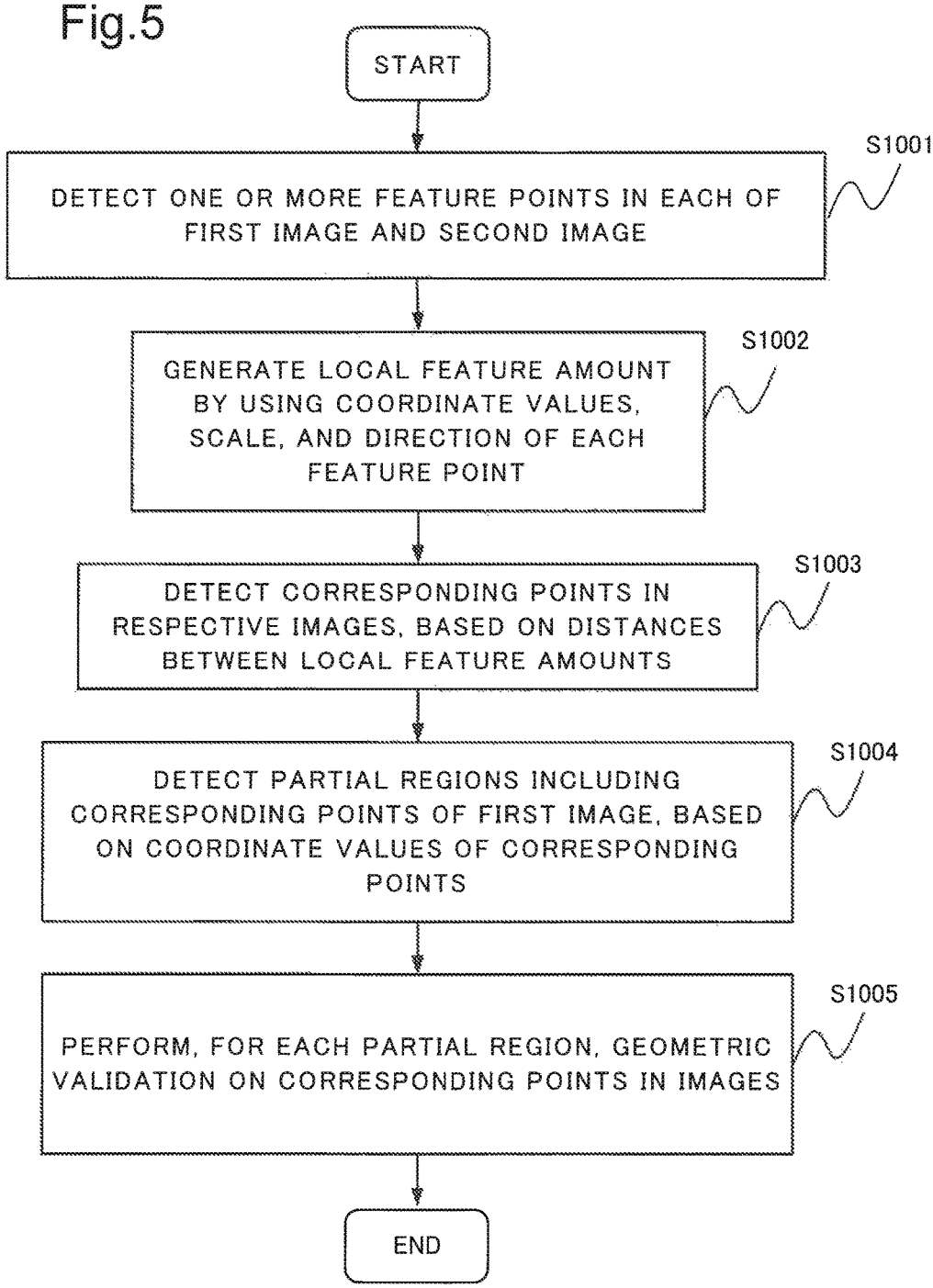
FIG. 5 is a flowchart illustrating an example of a process flow according to the first example embodiment.

Next, operations are described. FIG. 5 is a flowchart illustrating an example of a process flow of the first example embodiment.

The first local feature amount calculation unit 101 detects one or more feature points in the first image, and the second local feature amount calculation unit 102 detects one or more feature points in the second image (S1001).

Then, each of the first local feature amount calculation unit 101 and the second local feature amount calculation unit 102 calculates, for each feature point, a local feature amount by using information on the coordinate values, scale, and direction of the feature point (Step S1002). In Step S1002, each of the first local feature amount calculation unit 101 and the second local feature amount calculation unit 102 also calculates coordinate value information of each feature point.

The corresponding point detection unit 103 then calculates the distance between each of the local feature amounts in the first local feature amount group and each of the local feature amounts in the second local feature amount group (inter-local-feature-amount distance), detects corresponding points on the basis of the inter-local-feature-amount distances, and generates corresponding point information (Step S1003).

The partial region detection unit 104 then detects partial regions including the corresponding points of the first image, on the basis of the coordinate values of the corresponding points (S1004).

The matching unit 105 performs, for each of the partial region, geometric validation on the corresponding points of the images, and identifies objects that are the same or similar in the images on the basis of the total number of the corresponding points each having geometric match (S1005).

As described above, the image processing device 10 of the first example embodiment of the present invention performs, for each of the partial regions detected on the basis of the coordinate values of the feature points, geometric validation on the corresponding points and identifies objects that are the same or similar, in the images on the basis of the number of corresponding points each having geometric match. As described above, in each partial region, the relative positional relationships of the corresponding points of the first image included in the partial region do not change significantly. Hence, by performing geometric validation on the corresponding points for each partial region, it is possible to accurately identify an object in the first image and an object in the second image even when the objects have a change in shape.

Example Embodiment 2

Figure 6:
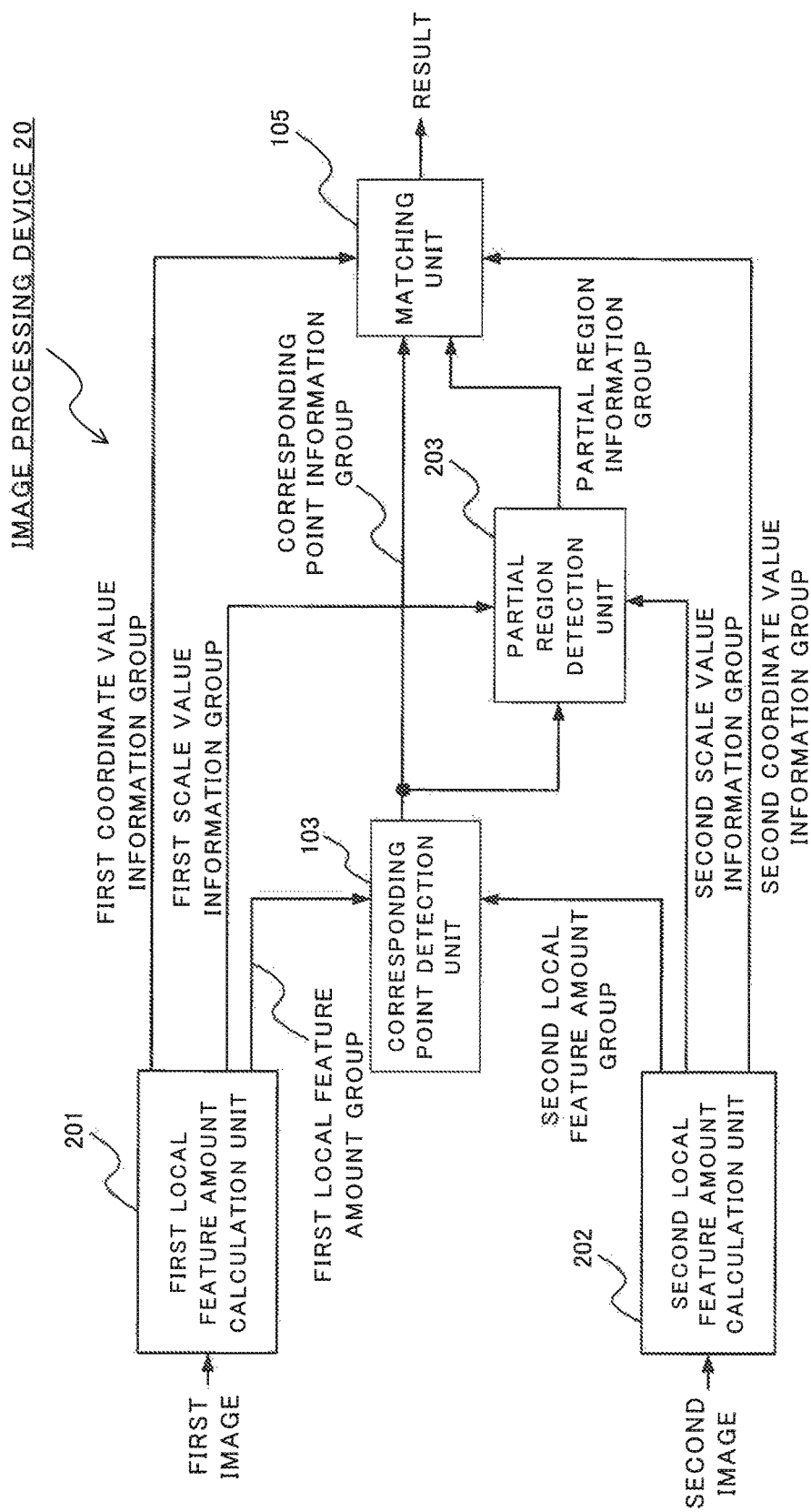
FIG. 6 is a block diagram illustrating an example of an image processing device according to a second example embodiment of the present invention.

FIG. 6 is a block diagram illustrating an example of an image processing device according to a second example embodiment of the present invention. An image processing device 20 of the second example embodiment detects partial regions by using the scale values of feature points. In the following explanation, the same reference signs are assigned to similar components to those already explained above, and an explanation thereof is omitted appropriately. This respect also applies to the third and subsequent example embodiments.

The image processing device 20 of the second example embodiment includes a first local feature amount calculation unit 201, a second local feature amount calculation unit 202, the corresponding point detection unit 103, a partial region detection unit 203, and the matching unit 105. Operations of the first local feature amount calculation unit 201, the second local feature amount calculation unit 202, and the partial region detection unit 203 are partially different from those in the first example embodiment.

The first local feature amount calculation unit 201 calculates a first local feature amount group and outputs the first local feature amount group to the corresponding point detection unit 103 by similar operations to those of the first local feature amount calculation unit 101. The first local feature amount calculation unit 201, similarly to the first local feature amount calculation unit 101, generates a first coordinate value information group and outputs the first coordinate value information group to the matching unit 105. The first local feature amount calculation unit 201 further generates a first scale value information group, which is a set of the scale values of the respective feature points detected in the first image, and outputs the first scale value information group to the partial region detection unit 203.

The second local feature amount calculation unit 202 calculates a second local feature amount group and outputs the second local feature amount group to the corresponding point detection unit 103 by similar operations to those of the first local feature amount calculation unit 201. The second local feature amount calculation unit 202, similarly to the first local feature amount calculation unit 201, generates a second coordinate value information group and outputs the second coordinate value information group to the matching unit 105. The second local feature amount calculation unit 202 further generates a second scale value information group, which is a set of the scale values of the respective feature points detected in the second image, and outputs the second scale value information group to the partial region detection unit 203.

The partial region detection unit 203 detects, as partial regions, regions including the corresponding points of the first image by using the first scale value information group output by the first local feature amount calculation unit 201, the second scale value information group output by the second local feature amount calculation unit 202, and a corresponding point information group output by the corresponding point detection unit 103. The partial region detection unit 203 detects partial regions so that the number of the partial regions exceeds a number satisfying a predetermined condition (for example, detects the partial regions so that the number of the partial regions exceeds a predetermined threshold). The partial region detection unit 203 then outputs, for each of the partial region, the partial region information group to the matching unit 105.

Specifically, the partial region detection unit 203 may calculate the partial regions on the basis of relative scales of the corresponding points, for example. The relative scale of corresponding points is a value representing the degree of difference between the scale value of a corresponding point of the first image and the scale value of a corresponding point of the second image.

The partial region detection unit 203 may use the ratio between the scale values of the corresponding points as the relative scale of the corresponding points. For example, the partial region detection unit 203 may calculate the relative scale by calculation according to Equation (1) below.

$$\sigma = s(q)/s(p) \qquad \text{Equation (1)}$$

In Equation (1), $\sigma$ denotes the relative scale of the corresponding points. $s(q)$ denotes the scale value of the q-th feature point detected in the first image. $s(p)$ denotes the scale value of the p-th feature point detected in the second image. These two feature points are associated with each other.

The partial region detection unit 203 may calculate the relative scale of the corresponding points by use of the logarithmic values of the scale values of the feature points, for example.

For example, when the first local feature amount calculation unit 201 and the second local feature amount calculation unit 202 extract scale values each having the characteristics of a logarithmic function, from the feature points, the partial region detection unit 203 may use the difference value between the scale values of the corresponding points as the relative scale of the corresponding points. For example, the partial region detection unit 203 may calculate the relative scale of the corresponding points by calculation according to Equation (2) below.

$$\sigma' = s'(q) - s'(p) \qquad \text{Equation (2)}$$

In Equation (2), $\sigma'$ denotes the relative scale of the corresponding points. $s'(q)$ denotes the scale value of the q-th feature point detected in the first image. $s'(p)$ denotes the scale value of the p-th feature point detected in the second image. The two feature points are associated with each other.

Figure 7:
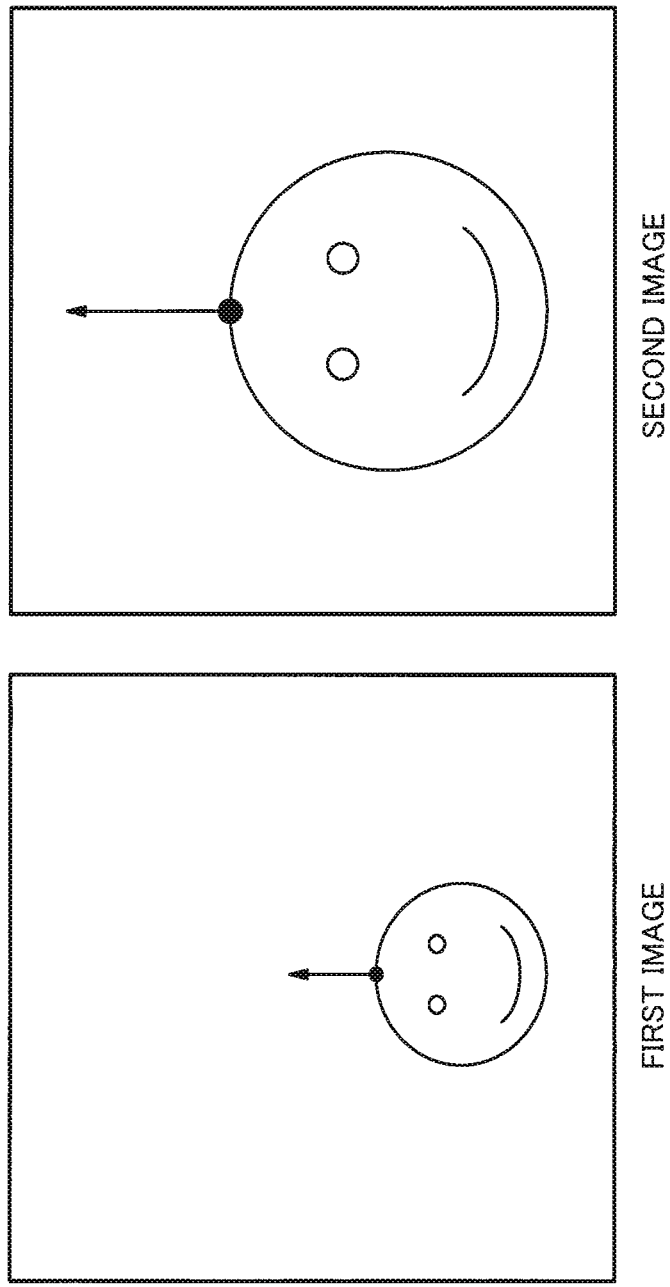
FIG. 7 is a schematic diagram illustrating characteristics of scale values.

Here, description is given of the characteristics of the scale values with reference to FIG. 7. A second image illustrated in FIG. 7 includes an object having a size twice as large as that in a first image illustrated in FIG. 7. Black circles illustrated in FIG. 7 represent corresponding points, and the sizes of arrows illustrated in FIG. 7 represent scale values. The scale value of a feature point has characteristics that the scale value relatively changes according to the size of the object in the image. For example, as illustrated in FIG. 7, when the size of the object in the image is doubled, the scale value of the feature point is also doubled. In contrast, when the size of the object in the image is halved, for example, the scale value of the feature point is also halved. Hence, the relative scale of corresponding points calculated by Equation (1) or Equation (2) has characteristics that the relative scale is fixed for each object when the feature point of the first image and the feature point of the second image are associated with each other correctly.

The partial region detection unit 203 may, for example, divide the first image into analysis regions having a predetermined size and consider each of the analysis regions as the partial region. The partial region detection unit 203 may form, for each of the partial region, a set of index numbers k of the pieces of corresponding point information of the corresponding points each having a relative scale being the same or similar, among the index numbers k of the pieces of corresponding point information in each of which one of the feature points of the first image included in the partial region is defined as a corresponding point, as a partial region information group. The shape and the like of each analysis region is similar to those of each analysis region in the first example embodiment, and hence an explanation thereof is omitted.

The partial region detection unit 203 may determine whether the relative scales of the corresponding points are similar, in the following manner, for example. The partial region detection unit 203 may calculate the inverse number of the absolute value of the difference between the relative scales of the corresponding points, as the degree of similarity, and determine that the relative scales are similar when the degree of similarity is higher than or equal to a threshold while determining that the relative scales are not similar when the degree of similarity is lower than the threshold. Note that a method of determining whether the relative scales of the corresponding points are similar is not limited to the above-described method.

The partial region detection unit 203 may perform clustering of the corresponding points of the first image on the basis of the relative scales calculated by using the corresponding points, consider each of the cluster as the partial region, and for each of the cluster, form a set of index numbers of the pieces of corresponding point information of the corresponding points belonging to the cluster, as the partial region information group, for example. In this case, the partial region detection unit 203 may perform clustering of the corresponding points of the first image by calculating the distance between the relative scale of each corresponding point included in the first image and the barycenter of each cluster and classifying the corresponding point to the cluster having the smallest calculated distance, for example. In this case, when one or more corresponding points each having the degree of similarity of the relative scale being lower than a predetermined threshold are included in a cluster, the partial region detection unit 203 may exclude, from the cluster, each corresponding point having a relative scale with a long distance to the barycenter of the cluster and classify the corresponding point into a different cluster, for example. Here, for example, a Euclidean distance, a Mahalanobis distance, or a city block distance may be used as the distance between the barycenter of a cluster and a relative scale. For the clustering, a similar method to that described in the first example embodiment may be employed.

The first local feature amount calculation unit 201, the second local feature amount calculation unit 202, the corresponding point detection unit 103, the partial region detection unit 203, and the matching unit 105 may be implemented by a CPU of a computer that operates in accordance with an image processing program, for example. In this case, the CPU may read the image processing program from a recording medium storing the program and operate as each of the above-described components in accordance with the program.

Figure 8:
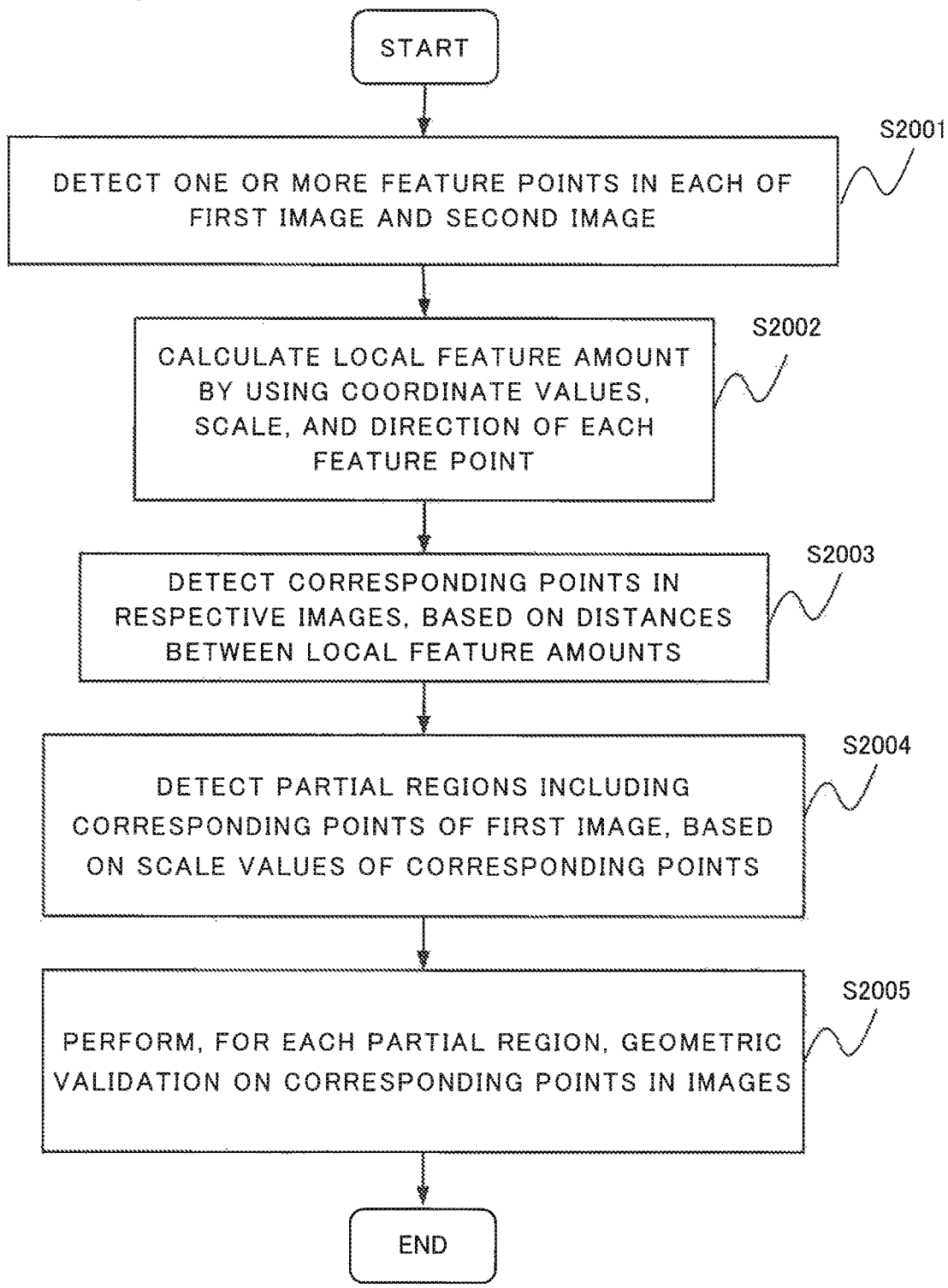
FIG. 8 is a flowchart illustrating an example of a process flow according to the second example embodiment.

FIG. 8 is a flowchart illustrating an example of a process flow of the second example embodiment. Steps S2001 to S2003 and Step S2005 included in FIG. 8 are similar to Steps S1001 to S1003 and Step S1005 included in FIG. 5, and hence an explanation thereof is omitted.

After the execution of Steps S2001 to S2003 in FIG. 8, the partial region detection unit 203 detects partial regions including the corresponding points of the first image, on the basis of the scale values of the corresponding points (Step S2004). Thereafter, the process advances to Step S2005.

The image processing device 20 of the second example embodiment of the present invention performs geometric validation on the corresponding points for each of the partial region detected by using the scale values of feature points and identifies the same or similar objects in images on the basis of the number of the corresponding points each having geometric match. In this example embodiment, since geometric validation is performed on the corresponding points for each of the partial region, it is possible to accurately identify an object in the first image and an object in the second image even when the objects have a difference in shape.

Example Embodiment 3

Figure 9:
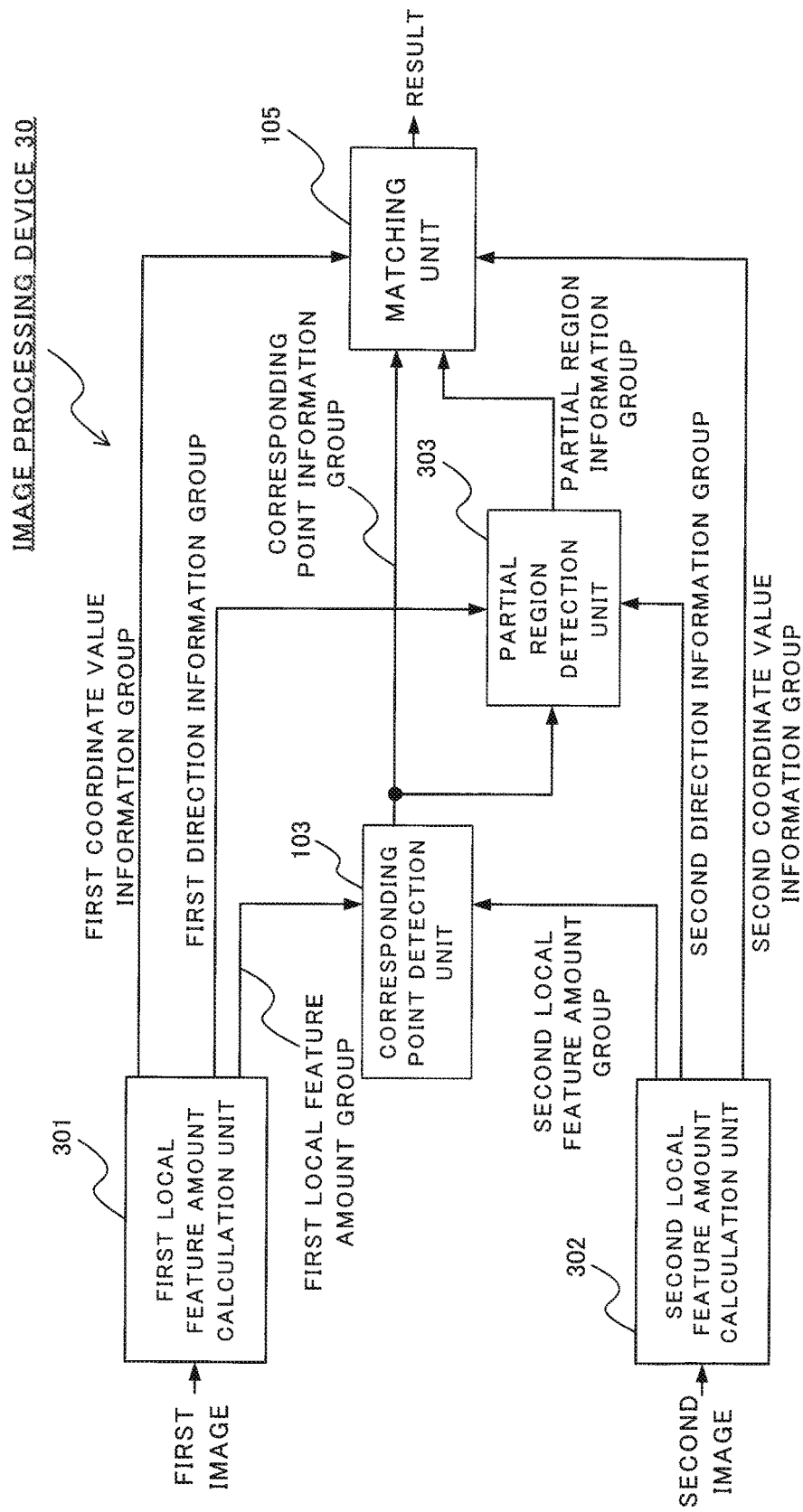
FIG. 9 is a block diagram illustrating an example of an image processing device according to a third example embodiment of the present invention.

FIG. 9 is a block diagram illustrating an example of an image processing device according to a third example embodiment of the present invention. An image processing device 30 of the third example embodiment detects partial regions by using pieces of direction information of feature points.

The image processing device 30 of the third example embodiment includes a first local feature amount calculation unit 301, a second local feature amount calculation unit 302, the corresponding point detection unit 103, a partial region detection unit 303, and the matching unit 105. Operations of the first local feature amount calculation unit 301, the second local feature amount calculation unit 302, and the partial region detection unit 203 are partially different from those of the above-described example embodiments.

The first local feature amount calculation unit 301 calculates a first local feature amount group and outputs the first local feature amount group to the corresponding point detection unit 103, through similar operations to those of the first local feature amount calculation unit 101. The first local feature amount calculation unit 301, similarly to the first local feature amount calculation unit 101, generates a first coordinate value information group and outputs the first coordinate value information group to the matching unit 105. Further, the first local feature amount calculation unit 301 generates a first direction information group, which is a set of pieces of direction information of the respective feature points detected in the first image, and outputs the first direction information group to the partial region detection unit 303.

The second local feature amount calculation unit 302 calculates a second local feature amount group and outputs the second local feature amount group to the corresponding point detection unit 103, through similar operations as those of the first local feature amount calculation unit 301. The second local feature amount calculation unit 302, similarly to the first local feature amount calculation unit 301, generates a second coordinate value information group and outputs the second coordinate value information group to the matching unit 105. Further, the second local feature amount calculation unit 302 generates a second direction information group, which is a set of pieces of direction information of the respective feature points detected in the second image, and outputs the second direction information group to the partial region detection unit 303.

The partial region detection unit 303 detects, as the partial regions, regions including the corresponding points of the first image by using the first direction information group output by the first local feature amount calculation unit 301, the second direction information group output by the second local feature amount calculation unit 302, and a corresponding point information group output by the corresponding point detection unit 103. The partial region detection unit 303 detects partial regions so that the number of the partial regions exceeds a number satisfying a predetermined condition (for example, detects partial regions so that the number of partial regions exceeds a predetermined threshold). The partial region detection unit 303 then outputs, for each partial region, a partial region information group to the matching unit 105.

Specifically, the partial region detection unit 303 may calculate the partial regions on the basis of the relative direction of corresponding points, for example. The relative direction of corresponding points is a value representing the degree of difference between the direction information of the corresponding point of the first image and the direction information of the corresponding point of the second image.

The partial region detection unit 303 may use the difference value between the pieces of direction information of corresponding points as the relative direction of the corresponding points. For example, the partial region detection unit 303 may calculate the relative direction of corresponding points by calculation according to Equation (3) below.

$$\rho = \theta(q) - \theta(p) \qquad \text{Equation (3)}$$

In Equation (3), $\rho$ denotes the relative direction of the corresponding points. $\theta(q)$ denotes direction information of the q-th feature point detected in the first image. $\theta(p)$ is direction information of the p-th feature point detected in the second image. The two feature points are associated with each other.

For example, when the first local feature amount calculation unit 301 and the second local feature amount calculation unit 302 extract pieces of direction information having characteristics of an exponential function from the feature points, the partial region detection unit 303 may use the ratio between the pieces of direction information of corresponding points as the relative direction of the corresponding points. For example, the partial region detection unit 303 may calculate the relative direction of corresponding points by calculation according to Equation (4) below.

$$\rho' = \theta'(q)/\theta'(p) \qquad \text{Equation (4)}$$

In Equation (4), $\rho'$ denotes the relative direction of the corresponding points. $\theta'(q)$ is direction information of the q-th feature point detected in the first image. $\theta'(p)$ is direction information of the p-th feature point detected in the second image. The two feature points are associated with each other.

Figure 10:
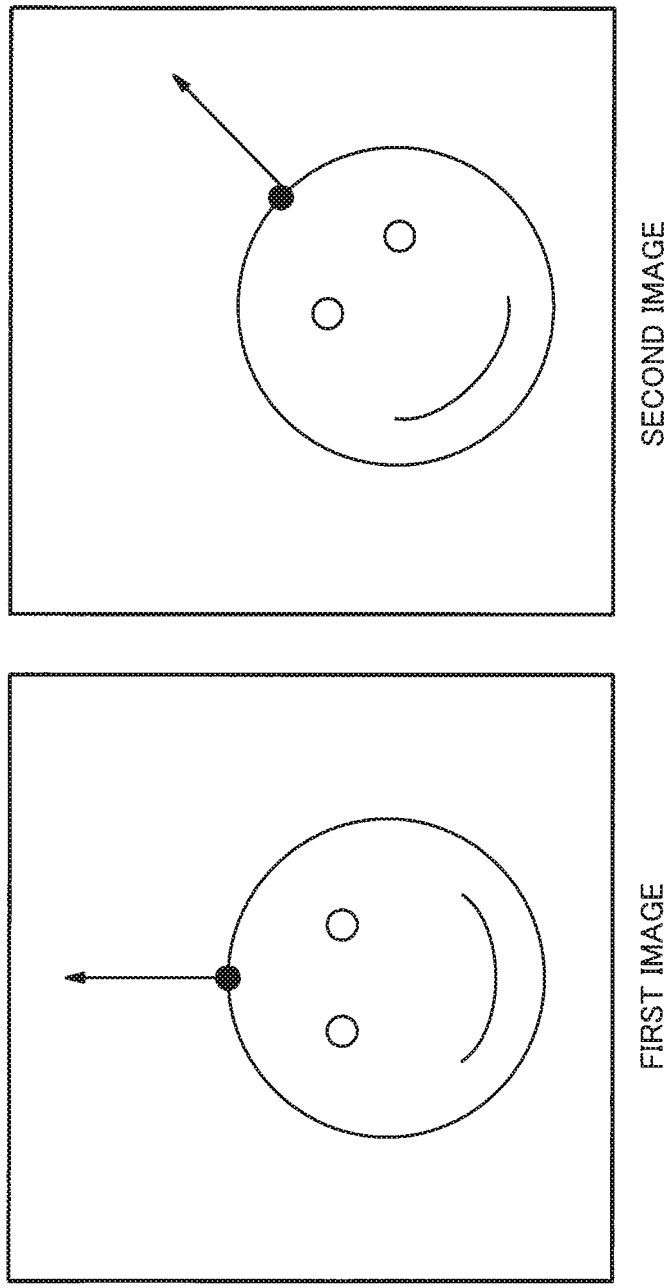
FIG. 10 is a schematic diagram illustrating identification of direction information.

An explanation is given below of identification of the direction information of a feature point with reference to FIG. 10. An object in a second image illustrated in FIG. 10 is rotated 45° with respect to an object in a first image illustrated in FIG. 10. Black circles illustrated in FIG. 10 represent corresponding points, and the directions of arrows illustrated in FIG. 10 represent pieces of direction information of the respective feature points. As illustrated in FIG. 10, the direction information of a feature point has characteristics that the direction information relatively changes according to rotation of an object in an image. Specifically, when an object in an image rotates 45°, the pieces of direction information of all the feature points of the object rotate 45°. Hence, the relative direction of corresponding points calculated by Equation (3) or Equation (4) has characteristics that the relative direction is fixed for each object when the feature point of the first image and the feature point of the second image are associated with each other correctly.

The partial region detection unit 303 may divide a first image into analysis regions having a predetermined size and consider each analysis region as a partial region, for example. The partial region detection unit 303 may then form, for each of the partial region, a set of index numbers k of the pieces of corresponding point information of the corresponding points for each of which the relative direction is the same or similar among the index numbers k of the pieces of corresponding point information in each of which a feature point of the first image included in the partial region is defined as a corresponding point, as a partial region information group. The shape and the like of each analysis region is similar to those of each of the analysis region in the first example embodiment, and hence an explanation thereof is omitted.

The partial region detection unit 303 may determine whether or not the relative directions of the corresponding points are similar in the following manner, for example. The partial region detection unit 303 may calculate an inverse number of an absolute value of the difference between the relative directions of the corresponding points as the degree of similarity, and determine that the relative directions are similar when the degree of similarity is higher than or equal to a threshold while determining that the relative directions are not similar when the degree of similarity is lower than the threshold. Note that a method of determining whether or not the relative directions of the corresponding points are similar is not limited to the above-described method.

The partial region detection unit 303 may perform clustering of the corresponding points of the first image on the basis of the relative directions calculated by using the corresponding points, consider each of the cluster as the partial region, and form, for each cluster, a set of index numbers of the pieces of corresponding point information of the corresponding points belonging to the cluster as the partial region information group, for example. In this case, the partial region detection unit 303 may perform clustering of the corresponding points of the first image by calculating the distance between the relative direction of each corresponding point included in the first image and the barycenter of each cluster and classifying the corresponding point to the cluster having the smallest calculated distance, for example. In this case, when one or more corresponding points each having a degree of similarity of the relative direction being lower than a predetermined threshold are included in a cluster, the partial region detection unit 303 may exclude, from the cluster, each corresponding point having a relative direction with a long distance to the barycenter of the cluster and classify the corresponding point into a different cluster, for example. Here, for example, a Euclidean distance, a Mahalanobis distance, or a city block distance may be used as the distance between the barycenter of a cluster and a relative direction. For the clustering, a similar method to that described in the first example embodiment may be employed.

The first local feature amount calculation unit 301, the second local feature amount calculation unit 302, the corresponding point detection unit 103, the partial region detection unit 303, and the matching unit 105 may be implemented by a CPU of a computer that operates in accordance with an image processing program, for example. In this case, the CPU may read the image processing program from a recording medium storing the program and operate as each of the above-described components in accordance with the program.

Figure 11:
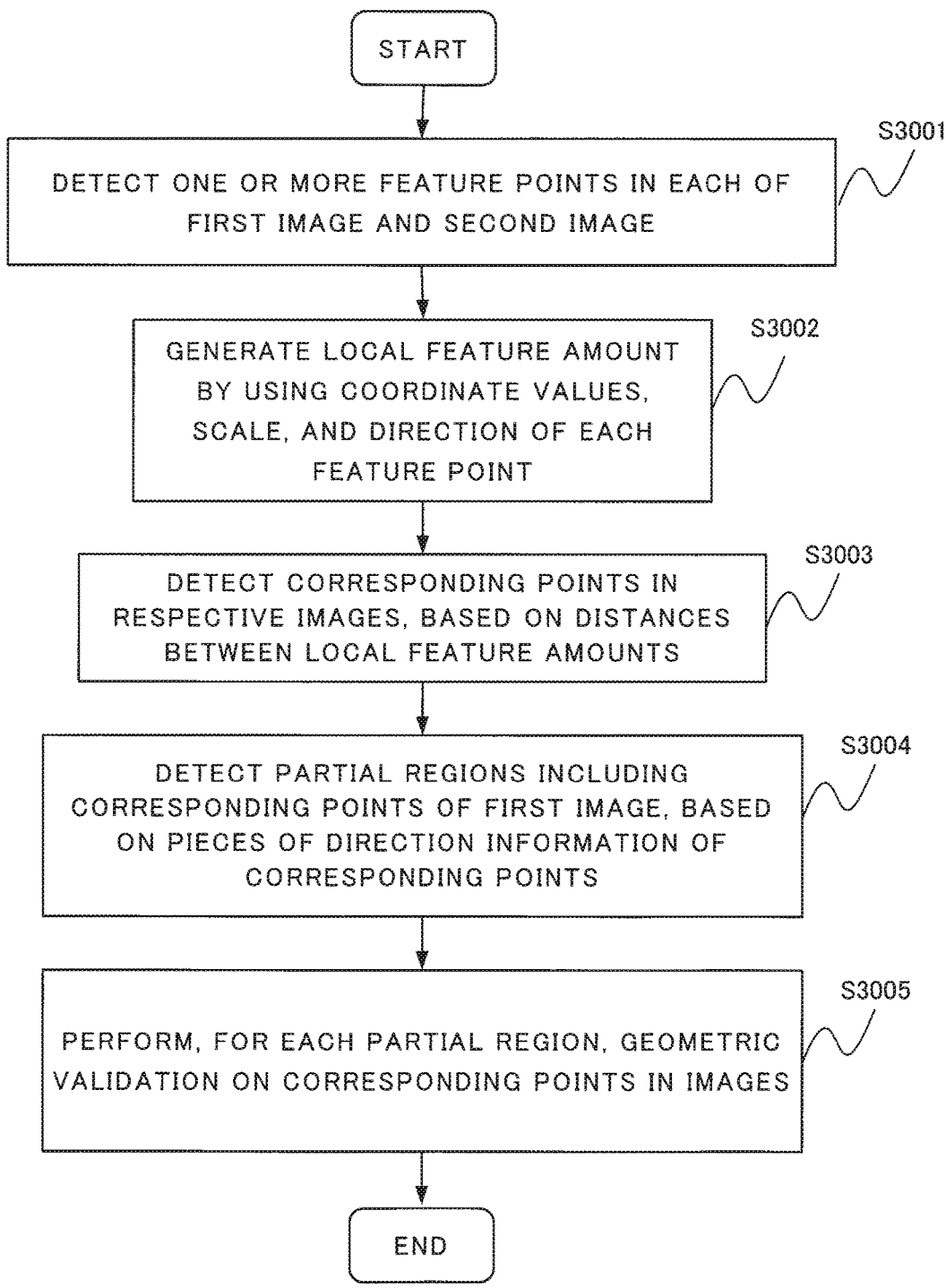
FIG. 11 is a flowchart illustrating an example of a process flow according to the third example embodiment.

FIG. 11 is a flowchart illustrating an example of a process flow of the third example embodiment. Steps S3001 to S3003 and Step S3005 included in FIG. 11 are similar to Steps S1001 to S1003 and Step S1005 included in FIG. 5, and hence an explanation thereof is omitted.

After the execution of Steps S3001 to S3003 in FIG. 11, the partial region detection unit 303 detects partial regions including the corresponding points of the first image, on the basis of the pieces of direction information of the corresponding points (Step S3004). Thereafter, the process advances to Step S3005.

The image processing device 30 of the third example embodiment of the present invention performs geometric validation on corresponding points for each partial region detected by using pieces of direction information of feature points, and identifies the same or similar objects in images on the basis of the number of corresponding points each having geometric match. In this example embodiment, since geometric validation on corresponding points is performed for each of the partial region, it is possible to accurately identify an object in the first image and an object in the second image even when the objects have a difference in shape.

Example Embodiment 4

Figure 12:
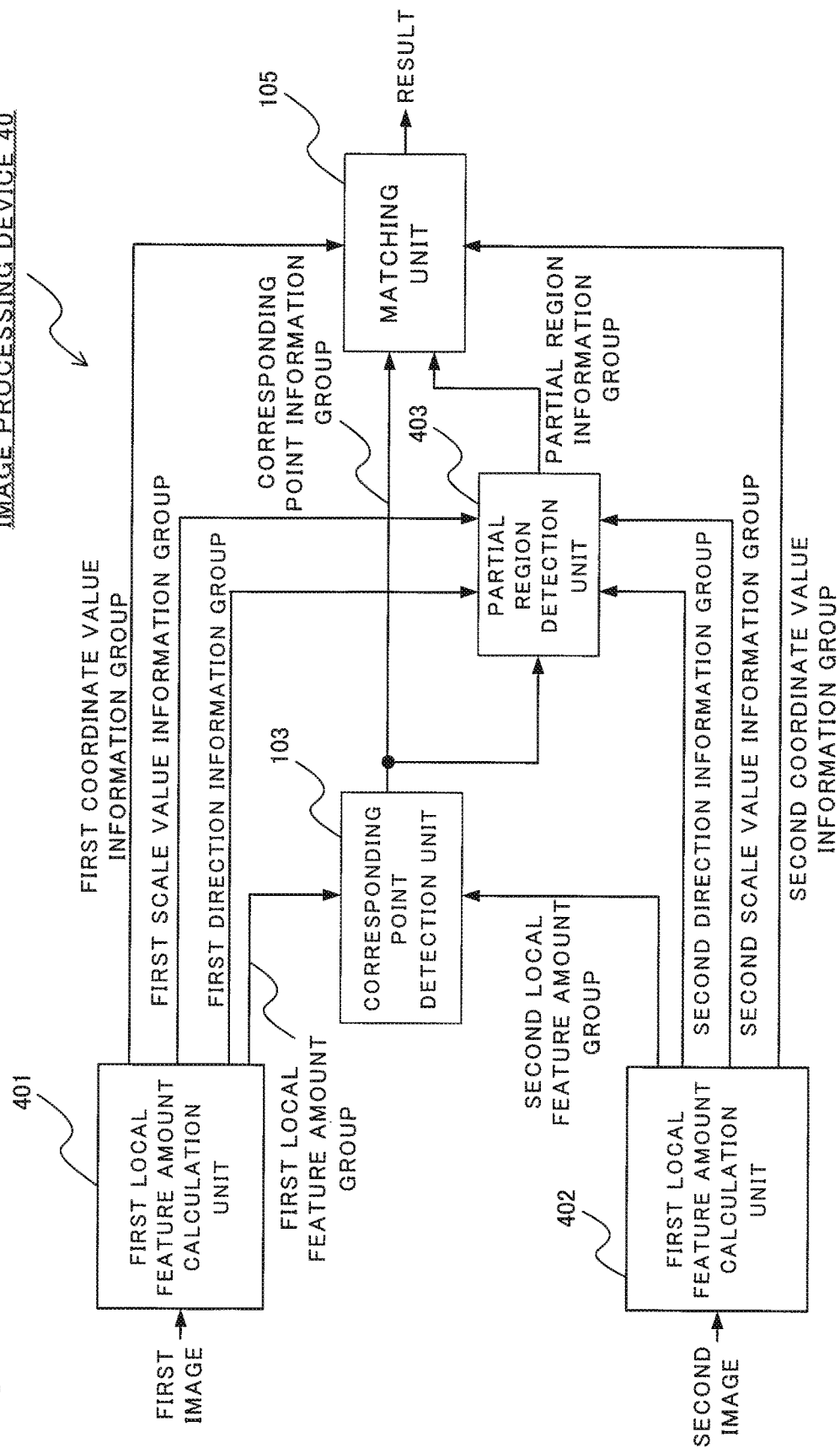
FIG. 12 is a block diagram illustrating an example of an image processing device according to a fourth example embodiment of the present invention.

FIG. 12 is a block diagram illustrating an example of an image processing device according to a fourth example embodiment of the present invention. An image processing device 40 of the fourth example embodiment detects partial regions by using scale values and pieces of direction information of feature points.

The image processing device 40 of the fourth example embodiment includes a first local example amount calculation unit 401, a second local feature amount calculation unit 402, the corresponding point detection unit 103, a partial region detection unit 403, and the matching unit 105. Operations of the first local feature amount calculation unit 401, the second local feature amount calculation unit 402, and the partial region detection unit 403 are partially different from those of the above-described example embodiments.

The first local feature amount calculation unit 401 calculates the first local feature amount group and outputs the first local feature amount group to the corresponding point detection unit 103, through similar operations to those of the first local feature amount calculation unit 101. The first local feature amount calculation unit 401 also generates, similarly to the first local feature amount calculation unit 101, the first coordinate value information group and outputs the first coordinate value information group to the matching unit 105. Further, the first local feature amount calculation unit 401, similarly to the first local feature amount calculation unit 201, generates a first scale value information group and outputs the first scale value information group to the partial region detection unit 403. The first local feature amount calculation unit 401, similarly to the first local feature amount calculation unit 301, further generates a first direction information group and outputs the first direction information group to the partial region detection unit 403.

The second local feature amount calculation unit 402 calculates the second local feature amount group and outputs the second local feature amount group to the corresponding point detection unit 103, through similar operations as those of the first local feature amount calculation unit 401. The second local feature amount calculation unit 402, similarly to the first local feature amount calculation unit 401, generates the second coordinate value information group and outputs the second coordinate value information group to the matching unit 105. Further, the second local feature amount calculation unit 402, similarly to the first local feature amount calculation unit 401, generates the second scale value information group and outputs the second scale value information group to the partial region detection unit 403. The second local feature amount calculation unit 402, similarly to the first local feature amount calculation unit 401, further generates the second direction information group and outputs the second direction information group to the partial region detection unit 403.

The partial region detection unit 403 detects, as the partial regions, regions including corresponding points of the first image, by using the first scale value information group and the first direction information group output by the first local feature amount calculation unit 401, the second scale value information group and the second direction information group output by the second local feature amount calculation unit 402, and a corresponding point information group output by the corresponding point detection unit 103. The partial region detection unit 403 detects partial regions so that the number of partial regions exceeds a number satisfying a predetermined condition (for example, detects partial regions so that the number of partial regions exceeds a predetermined threshold). The partial region detection unit 403 then outputs, for each partial region, a partial region information group to the matching unit 105.

The partial region detection unit 403 may, for example, calculate partial regions on the basis of the relative scales and relative directions of the corresponding points. The method of calculating the relative scale of corresponding points and the method of calculating the relative direction of corresponding points are explained respectively in the second example embodiment and the third example embodiment, and hence explanations thereof are omitted in this and subsequent example embodiments.

Specifically, the partial region detection unit 403 divides the corresponding points of the first image into groups each including the corresponding points that have the same or similar relative scales and also have the same or similar relative directions. The partial region detection unit 403 may then form, for each group, a set of index numbers k of the pieces of corresponding point information of the corresponding points belonging to the group as a partial region information group. An example of the method of determining whether the relative scales of corresponding points are similar and an example of the method of determining whether the relative methods of corresponding points are similar are already explained, and hence explanation thereof is omitted in this and subsequent example embodiments.

The first local feature amount calculation unit 401, the second local feature amount calculation unit 402, the corresponding point detection unit 103, the partial region detection unit 403, and the matching unit 105 may be implemented by a CPU of a computer that operates in accordance with an image processing program, for example. In this case, the CPU may read the image processing program from a recording medium storing the program and operate as each of the above-described components in accordance with the program.

Figure 13:
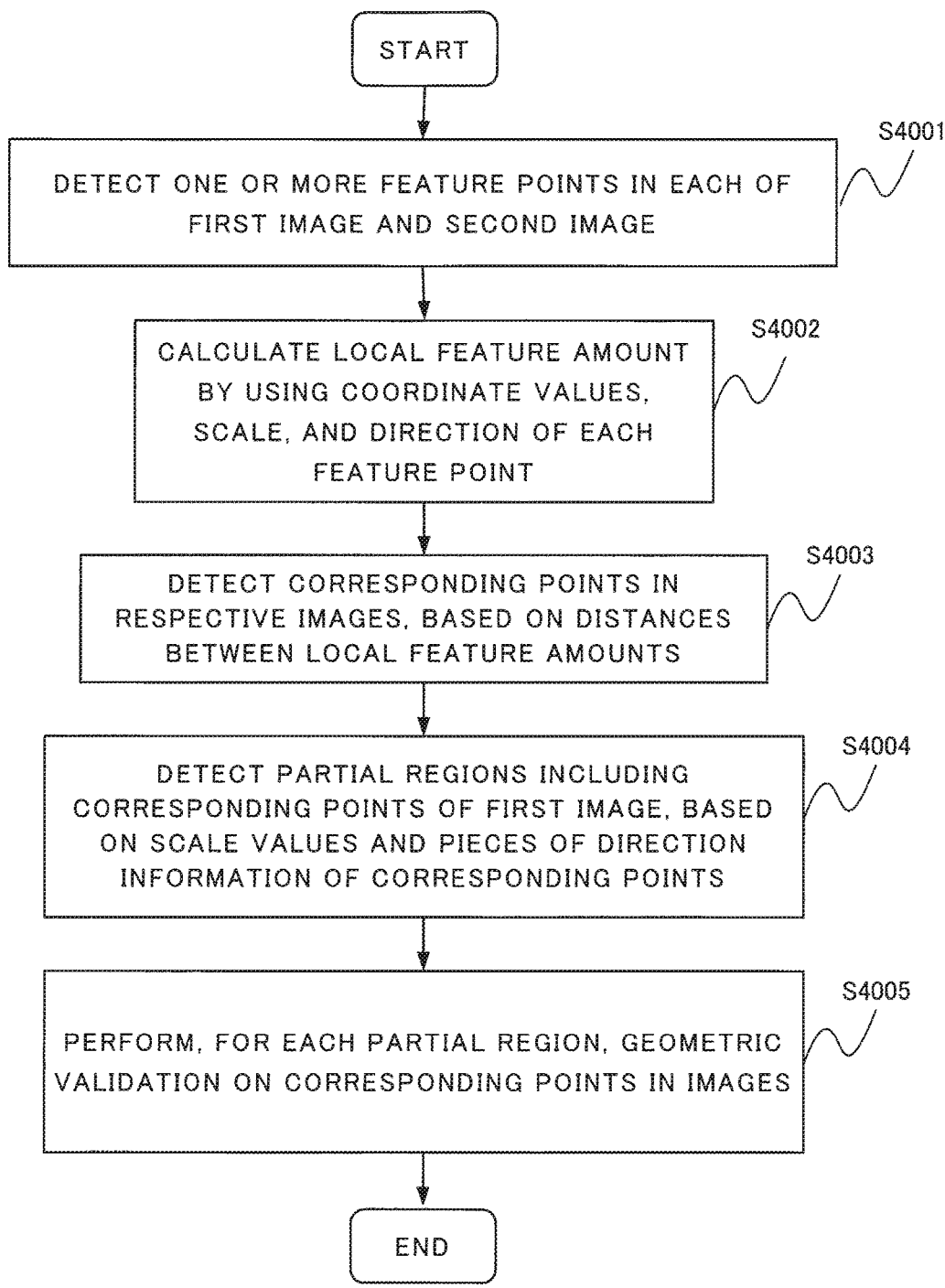
FIG. 13 is a flowchart illustrating an example of a process flow according to the fourth example embodiment.

FIG. 13 is a flowchart illustrating an example of a process flow of the fourth example embodiment. Steps S4001 to S4003 and Step S4005 included in FIG. 13 are similar to Steps S1001 to S1003 and Step S1005 included in FIG. 5, and hence an explanation thereof is omitted.

After the execution of Steps S4001 to S4003 in FIG. 13, the partial region detection unit 403 detects partial regions including the corresponding points of the first image, on the basis of the scale values and the pieces of direction information of the corresponding points (Step S4004). Thereafter, the process advances to Step S4005.

According to the image processing device 40 of the fourth example embodiment of the present invention, similar advantageous effects as those of the second example embodiment and the third example embodiment are obtained. In addition, partial regions are detected by using the scale values and the pieces of direction information of the corresponding points in the fourth example embodiment, which improves the accuracy in detecting partial regions in comparison with the second example embodiment and the third example embodiment. Hence, it is possible to improve the accuracy in identifying objects in comparison with the second example embodiment and the third example embodiment.

Example Embodiment 5

Figure 14:
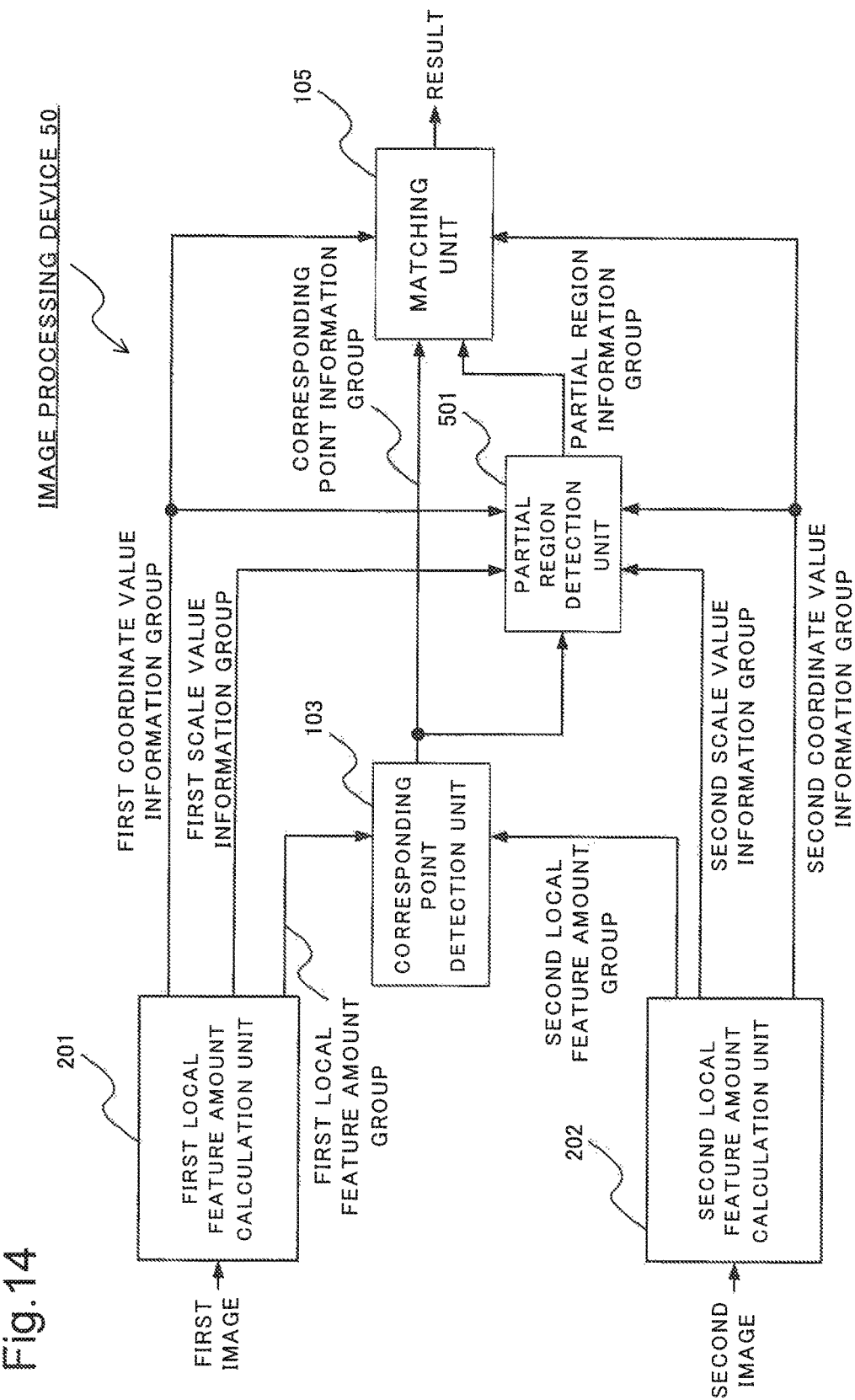
FIG. 14 is a block diagram illustrating an example of an image processing device according to a fifth example embodiment of the present invention.

FIG. 14 is a block diagram illustrating an example of an image processing device according to a fifth example embodiment of the present invention. An image processing device 50 of the fifth example embodiment detects partial regions by using the coordinate values and scale values of feature points.

The image processing device 50 of the fifth example embodiment includes a first local feature amount calculation unit 201, a second local feature amount calculation unit 202, the corresponding point detection unit 103, a partial region detection unit 501, and the matching unit 105. Operations of the partial region detection unit 501 are partially different from those of the above-described example embodiments.

The first local feature amount calculation unit 201 and the second local feature amount calculation unit 202 are similar to the components in the second example embodiment. Note that, in this example embodiment, the first local feature amount calculation unit 201 outputs the first coordinate value information group to the partial region detection unit 501 and the matching unit 105.

Similarly, the second local feature amount calculation unit 202 outputs the second coordinate value information group to the partial region detection unit 501 and the matching unit 105.

The partial region detection unit 501 detects, as the partial regions, regions including corresponding points of the first image, by using the first coordinate value information group and the first scale value information group output by the first local feature amount calculation unit 201, the second coordinate value information group and the second scale value information group output by the second local feature amount calculation unit 202, and a corresponding point information group output by the corresponding point detection unit 103. The partial region detection unit 501 detects partial regions so that the number of partial regions exceeds a number satisfying a predetermined condition (for example, detects partial regions so that the number of partial regions exceeds a predetermined threshold). The partial region detection unit 501 then outputs, for each partial region, a partial region information group to the matching unit 105.

The partial region detection unit 501 may, for example, calculate partial regions on the basis of the coordinate values and relative scales of the corresponding points.

Specifically, the partial region detection unit 501 divides the corresponding points of the first image into groups each including the corresponding points that have the same or similar coordinate values and also have the same or similar relative scales. The partial region detection unit 501 may then form, for each group, a set of index numbers k of the pieces of corresponding point information of the corresponding points belonging to the group, as the partial region information group. Whether the coordinate values of corresponding points of the first image are similar may be determined in the following manner, for example. The partial region detection unit 501 may determine whether the coordinates of the corresponding points of the first image are similar, under the condition that the corresponding points belong to the same analysis region or are classified into the same cluster. A method of determining whether the coordinates of corresponding points are similar is not limited to the above-described method.

The first local feature amount calculation unit 201, the second local feature amount calculation unit 202, the corresponding point detection unit 103, the partial region detection unit 501, and the matching unit 105 may be implemented by a CPU of a computer that operates in accordance with an image processing program, for example. In this case, the CPU may read the image processing program from a recording medium storing the program and operate as each of the above-described components in accordance with the program.

Figure 15:
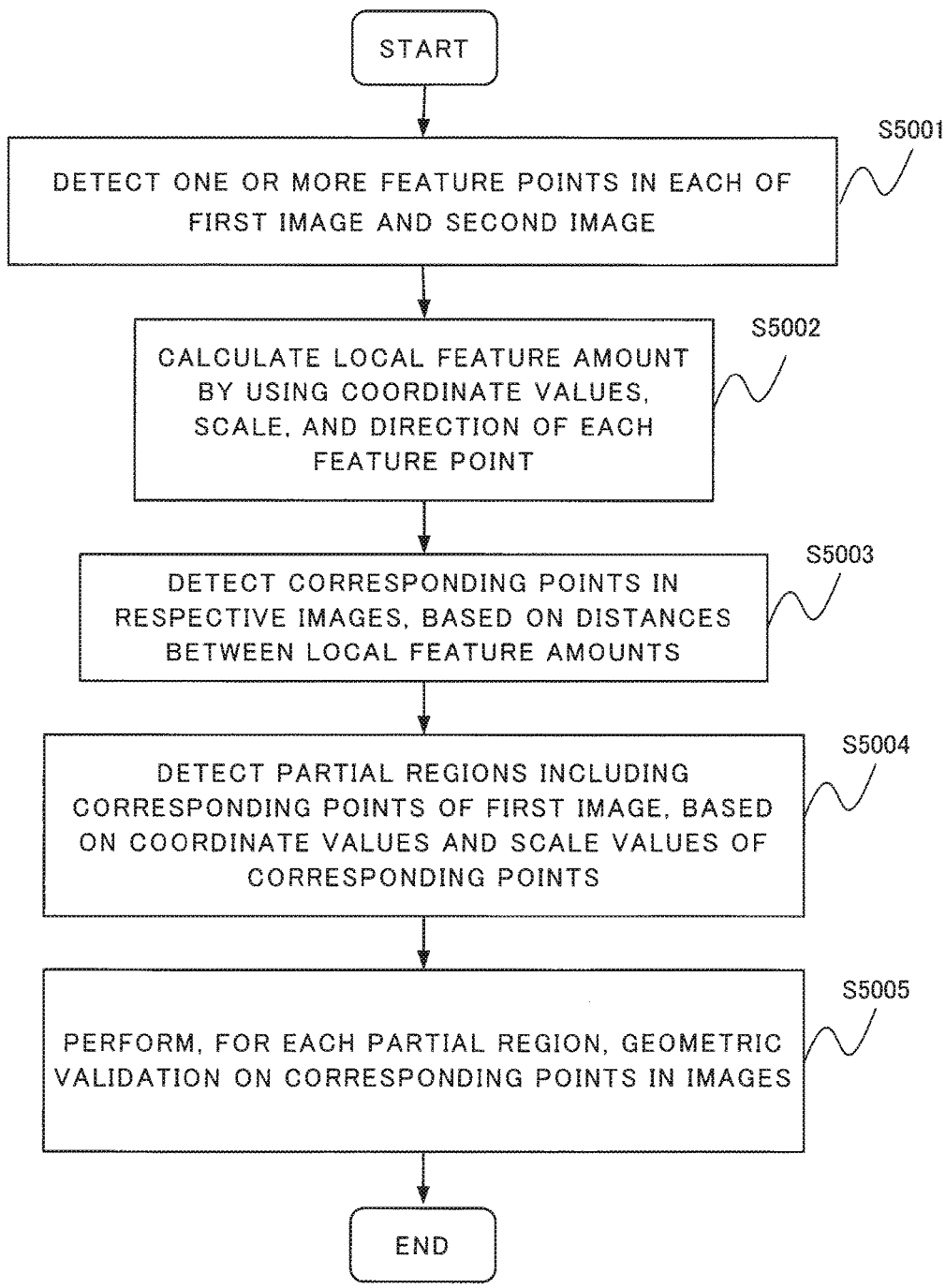
FIG. 15 is a flowchart illustrating an example of a process flow according to the fifth example embodiment.

FIG. 15 is a flowchart illustrating an example of a process flow of the fifth example embodiment. Steps S5001 to S5003 and Step S5005 included in FIG. 15 are similar to Steps S1001 to S1003 and Step S1005 included in FIG. 5, and hence an explanation thereof is omitted.

After the execution of Steps S5001 to S5003 in FIG. 15, the partial region detection unit 501 detects partial regions including the corresponding points of the first image, on the basis of the coordinate values and the scale values of the corresponding points (Step S5004). Thereafter, the process advances to Step S5005.

According to the image processing device 50 of the fifth example embodiment of the present invention, similar advantageous effects as those of the second example embodiment are obtained. In addition, the partial regions are detected by using the coordinate values and the scale values of the corresponding points in the fifth example embodiment, which improves the accuracy in detecting partial regions in comparison with the second example embodiment. Hence, it is possible to improve the accuracy in identifying objects in comparison with the second example embodiment.

Example Embodiment 6

Figure 16:
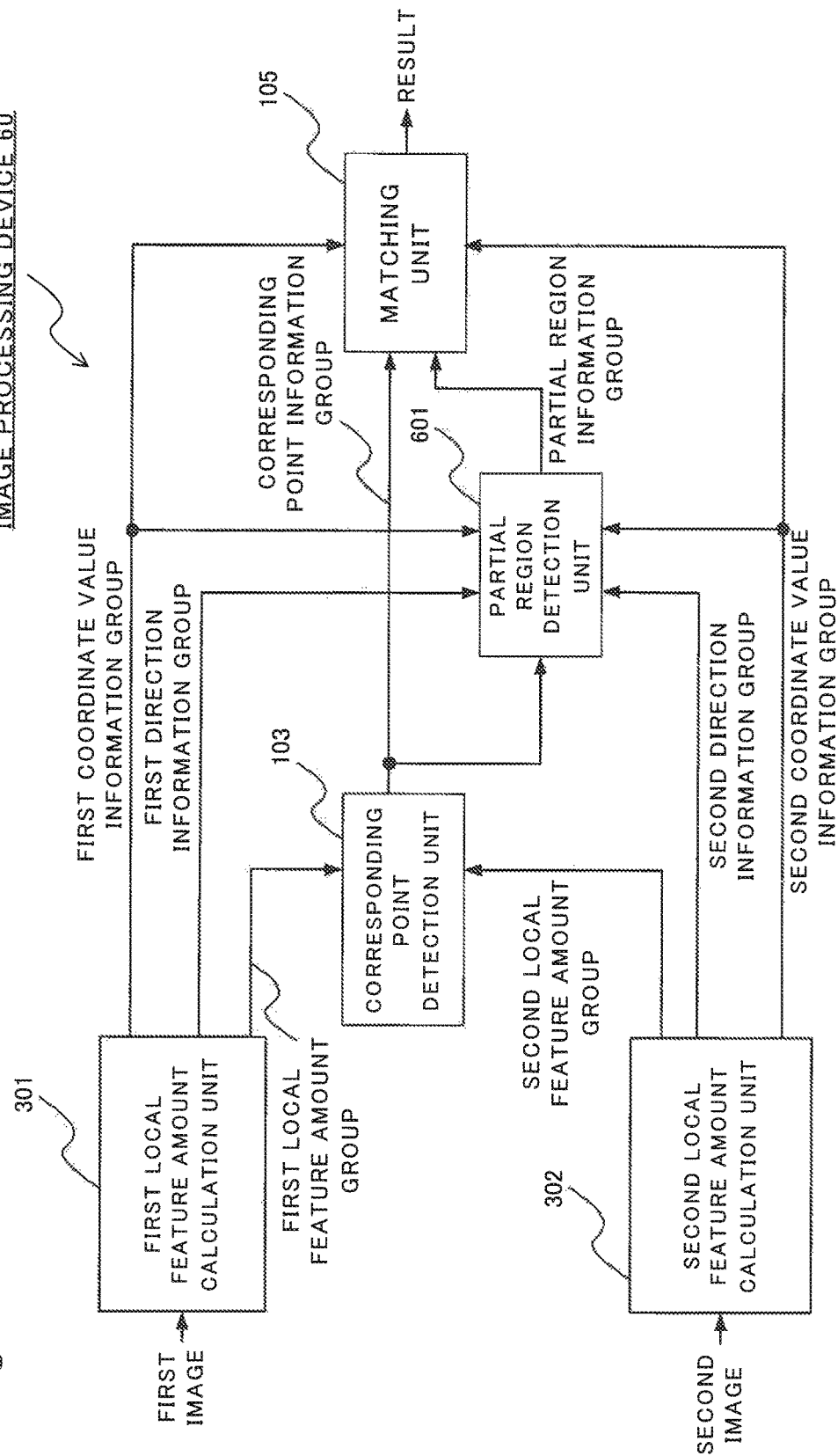
FIG. 16 is a block diagram illustrating an example of an image processing device according to a sixth example embodiment of the present invention.

FIG. 16 is a block diagram illustrating an example of an image processing device according to a sixth example embodiment of the present invention. An image processing device 60 of the sixth example embodiment detects partial regions by using the coordinate values and the pieces of direction information of feature points.

The image processing device 60 of the sixth example embodiment includes the first local feature amount calculation unit 301, the second local feature amount calculation unit 302, the corresponding point detection unit 103, a partial region detection unit 601, and the matching unit 105. Operations of the partial region detection unit 601 are partially different from those of the above-described example embodiments.

The first local feature amount calculation unit 301 and the second local feature amount calculation unit 302 are similar to the components in the third example embodiment. Note that, in this example embodiment, the first local feature amount calculation unit 301 outputs a first coordinate value information group to the partial region detection unit 601 and the matching unit 105.

Similarly, the second local feature amount calculation unit 302 outputs a second coordinate value information group to the partial region detection unit 601 and the matching unit 105.

The partial region detection unit 601 detects, as partial regions, regions including corresponding points of the first image, by using the first coordinate value information group and the first direction information group output by the first local feature amount calculation unit 301, the second coordinate value information group and the second direction information group output by the second local feature amount calculation unit 302, and a corresponding point information group output by the corresponding point detection unit 103. The partial region detection unit 601 detects the partial regions so that the number of partial regions exceeds a number satisfying a predetermined condition (for example, detects the partial regions so that the number of partial regions exceeds a predetermined threshold). The partial region detection unit 601 then outputs, for each partial region, the partial region information group to the matching unit 105.

The partial region detection unit 601 may, for example, calculate partial regions on the basis of the coordinate values and relative directions of the corresponding points.

Specifically, the partial region detection unit 601 divides the corresponding points of the first image into groups each including the corresponding points that have the same or similar coordinate values and also have the same or similar relative directions. The partial region detection unit 601 may then form, for each group, a set of index numbers k of the pieces of corresponding point information of the corresponding points belonging to the group, as a partial region information group. An example of the method of determining whether the coordinate values of corresponding points of the first image are similar is already explained, and hence an explanation thereof is omitted here.

The first local feature amount calculation unit 301, the second local feature amount calculation unit 302, the corresponding point detection unit 103, the partial region detection unit 601, and the matching unit 105 may be implemented by a CPU of a computer that operates in accordance with an image processing program, for example. In this case, the CPU may read the image processing program from a recording medium storing the program and operate as each of the above-described components in accordance with the program.

Figure 17:
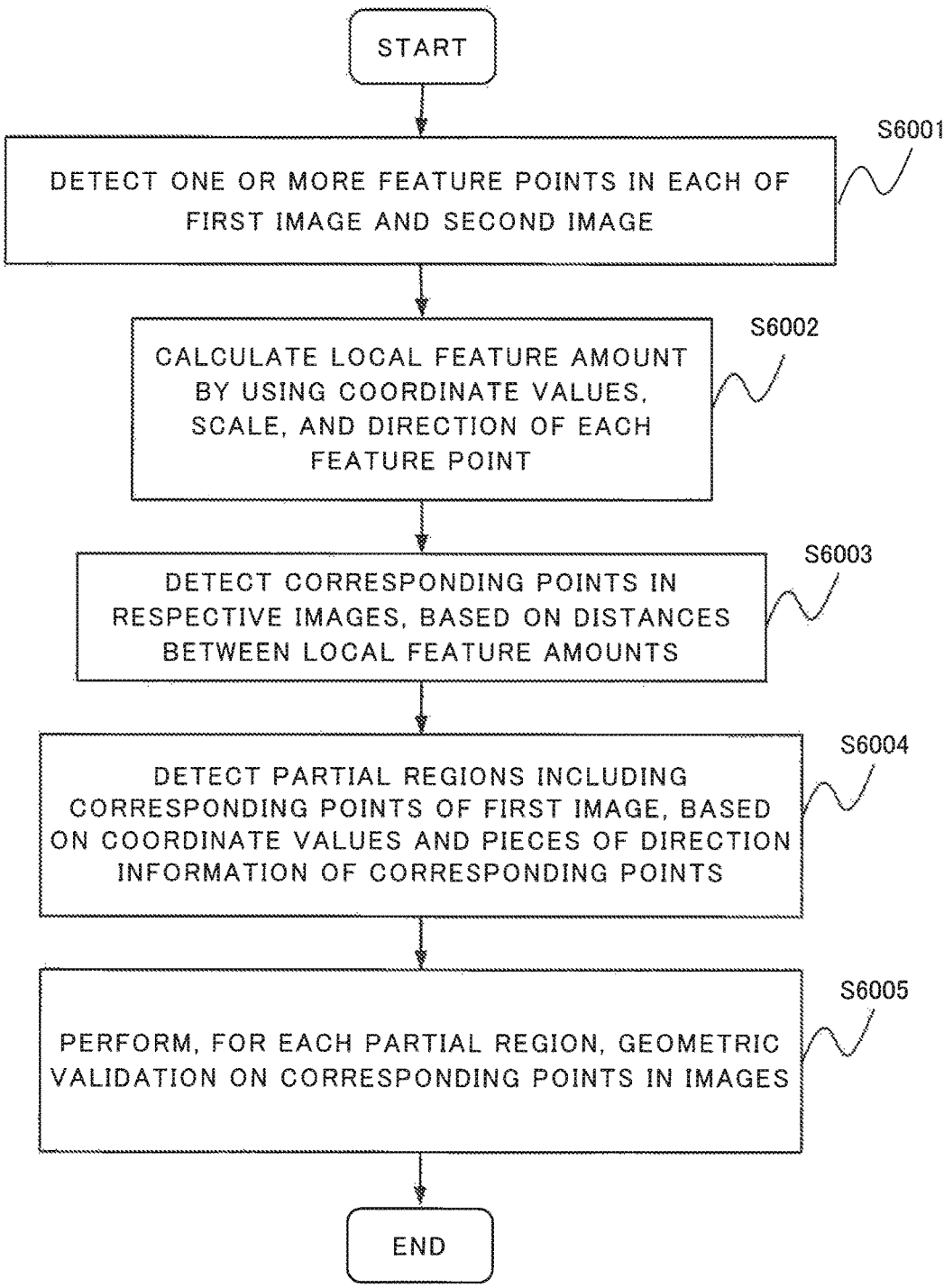
FIG. 17 is a flowchart illustrating an example of a process flow according to the sixth example embodiment.

FIG. 17 is a flowchart illustrating an example of a process flow of the sixth example embodiment. Steps S6001 to S6003 and Step S6005 included in FIG. 17 are similar to Steps S1001 to S1003 and Step S1005 included in FIG. 5, and hence an explanation thereof is omitted.

After the execution of Steps S6001 to S6003 in FIG. 17, the partial region detection unit 601 detects partial regions including the corresponding points of the first image, on the basis of the coordinate values and the pieces of direction information of the corresponding points (Step S6004). Thereafter, the process advances to Step S6005.

According to the image processing device 60 of the sixth example embodiment of the present invention, similar advantageous effects as those of the third example embodiment are obtained. In addition, partial regions are detected by using the coordinate values and the pieces of direction information of the corresponding points in the sixth example embodiment, which improves the accuracy in detecting partial regions in comparison with the third example embodiment.

Hence, it is possible to improve the accuracy in identifying objects in comparison with the third example embodiment.
Example Embodiment 7

Figure 18:
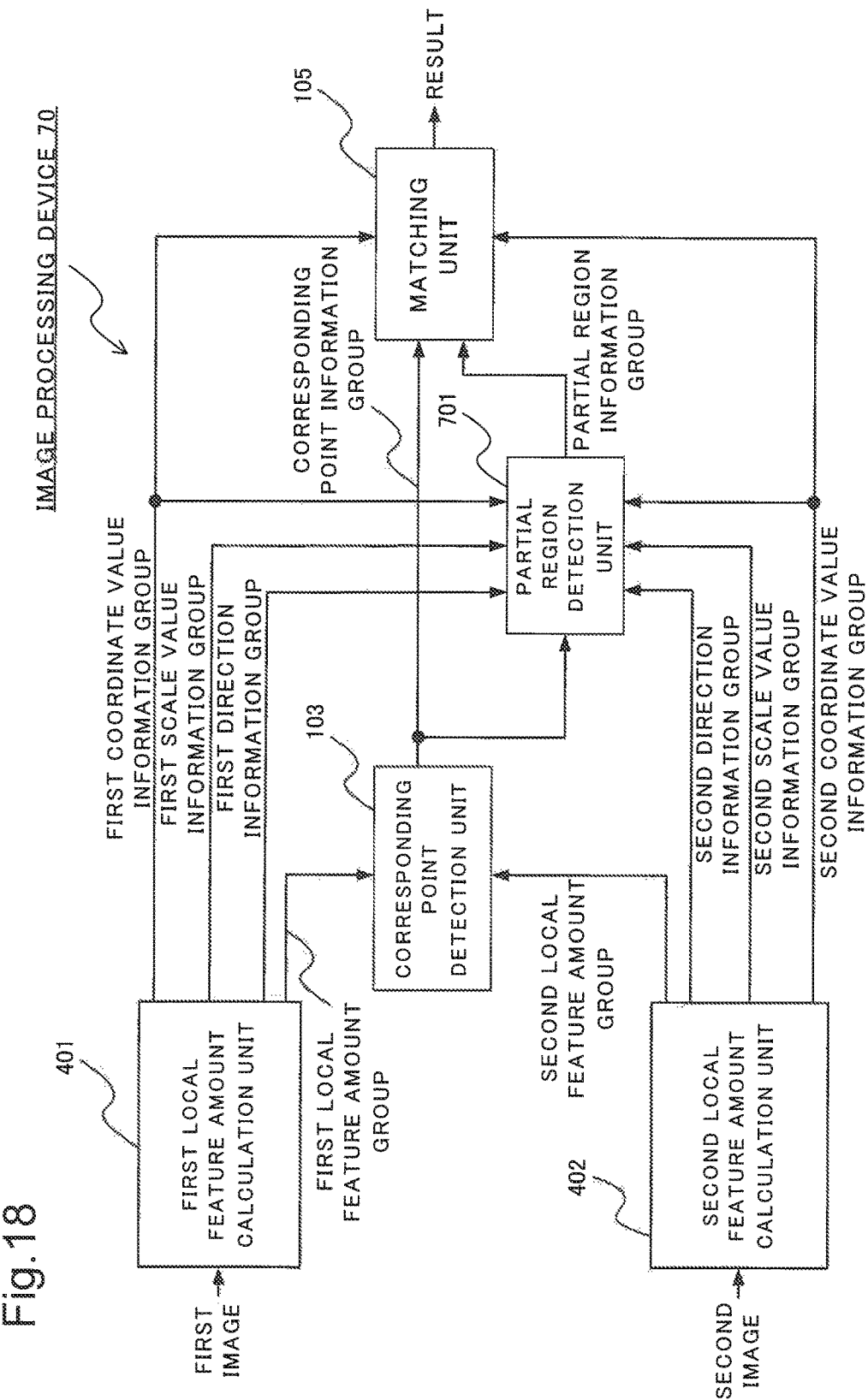
FIG. 18 is a block diagram illustrating an example of an image processing device according to a seventh example embodiment of the present invention.

FIG. 18 is a block diagram illustrating an example of an image processing device according to a seventh example embodiment of the present invention. An image processing device 70 of the seventh example embodiment detects partial regions by using the coordinate values, the scale values, and the pieces of direction information of feature points.

The image processing device 70 of the seventh example embodiment includes the first local feature amount calculation unit 401, the second local feature amount calculation unit 402, the corresponding point detection unit 103, a partial region detection unit 701, and the matching unit 105. Operations of the partial region detection unit 701 are partially different from those of the above-described example embodiments.

The first local feature amount calculation unit 401 and the second local feature amount calculation unit 402 are similar to the components in the fourth example embodiment. Note that, in this example embodiment, the first local feature amount calculation unit 401 outputs the first coordinate value information group to the partial region detection unit 701 and the matching unit 105.

Similarly, the second local feature amount calculation unit 402 outputs the second coordinate value information group to the partial region detection unit 701 and the matching unit 105.

The partial region detection unit 701 detects, as the partial regions, regions including corresponding points of the first image, by using the first coordinate value information group, the first scale value information group, and the first direction information group output by the first local feature amount calculation unit 401, the second coordinate value information group, the second scale value information group, and the second direction information group output by the second local feature amount calculation unit 402, and a corresponding point information group output by the corresponding point detection unit 103. The partial region detection unit 701 detects the partial regions so that the number of the partial regions exceeds a number satisfying a predetermined condition (for example, detects partial regions so that the number of partial regions exceeds a predetermined threshold). The partial region detection unit 701 then outputs, for each of the partial region, a partial region information group to the matching unit 105.

The partial region detection unit 701 may calculate the partial regions on the basis of the coordinate values, the relative scales, and the relative directions of the corresponding points, for example.

Specifically, the partial region detection unit 701 divides the corresponding points of the first image into groups each including the corresponding points that have the same or similar coordinate values, have the same or similar relative scales, and also have the same or similar relative directions. The partial region detection unit 701 may then form, for each group, a set of index numbers k of the pieces of corresponding point information of the corresponding points belonging to the group, as a partial region information group. An example of the method of determining whether the coordinate values of corresponding points of the first image are similar is already explained, and hence an explanation thereof is omitted here.

The partial region detection unit 701 may, for example, transform the coordinate values of the corresponding points of the first image into coordinate values in a coordinate system and then detect partial regions. As the coordinate system, a coordinate system in which certain coordinate values of the object in the second image are set as the origin may be used, for example. For convenience of explanation, an explanation is given below by taking, as an example, a case in which the coordinate values of the corresponding points of the first image are transformed into coordinate values in a coordinate system having the center coordinate values of the object (object center point) in the second image as the origin.

The partial region detection unit 701 may transform the coordinate values of the corresponding points of the first image into coordinate values in a coordinate system by using Equation (5) below, for example.

[Math. 1]

$$c_{qp} = v_q + \left( \sigma_{qp} \times \begin{pmatrix} \cos\rho_{qp} & -\sin\rho_{qp} \\ \sin\rho_{qp} & \cos\rho_{qp} \end{pmatrix} \times u'_p \right) \quad \text{Equation (5)}$$

In Equation (5), q in subscript denotes the index number of a feature point of the first image, and p in subscript denotes the index number of a feature point of the second image. In the following, the q-th feature point of the first image is referred to as a feature point q, and the p-th feature point of the second image is referred to as a feature point p. The feature point q and the feature point p are associated with each other. vq denotes a coordinate values of the feature point q. σqp denotes the relative scale of the feature points of the pair of the feature point q and the feature point p. ρqp denotes the relative direction of the corresponding points of the pair of the feature point q and the feature point p. cqp denotes the coordinate values of the object center of the first image. u'p is the vector from the feature point p of the second image to the object center of the second image. The partial region detection unit 701 may calculate the vector u'p by calculation according to Equation (6) below, for example.

[Math. 2]

$$u'_p = [x_c - x_p, y_c - y_p]^T \quad \text{Equation (6)}$$

In Equation (6), xp denotes the x coordinate value of the feature point p of the second image, and yp denotes the y coordinate value of the feature point p of the second image. xc denotes the x coordinate value of the object center of the second image, and yc denotes the y coordinate value of the object center of the second image.

Transforming the coordinate values of the coordinate points of the first image by using Equation (5) and Equation (6) gathers the corresponding points of the same object in one area. Hence, it is possible to improve the accuracy in detecting partial regions.

Note that, in a similar manner to the above, the partial regions may be detected after transformation of the feature points of the first image also in the above-described example embodiments.

The first local feature amount calculation unit 401, the second local feature amount calculation unit 402, the corresponding point detection unit 103, the partial region detection unit 701, and the matching unit 105 may be implemented by a CPU of a computer that operates in accordance with an image processing program, for example. In this case, the CPU may read the image processing program from a recording medium storing the program and operate as each of the above-described components in accordance with the program.

Figure 19:
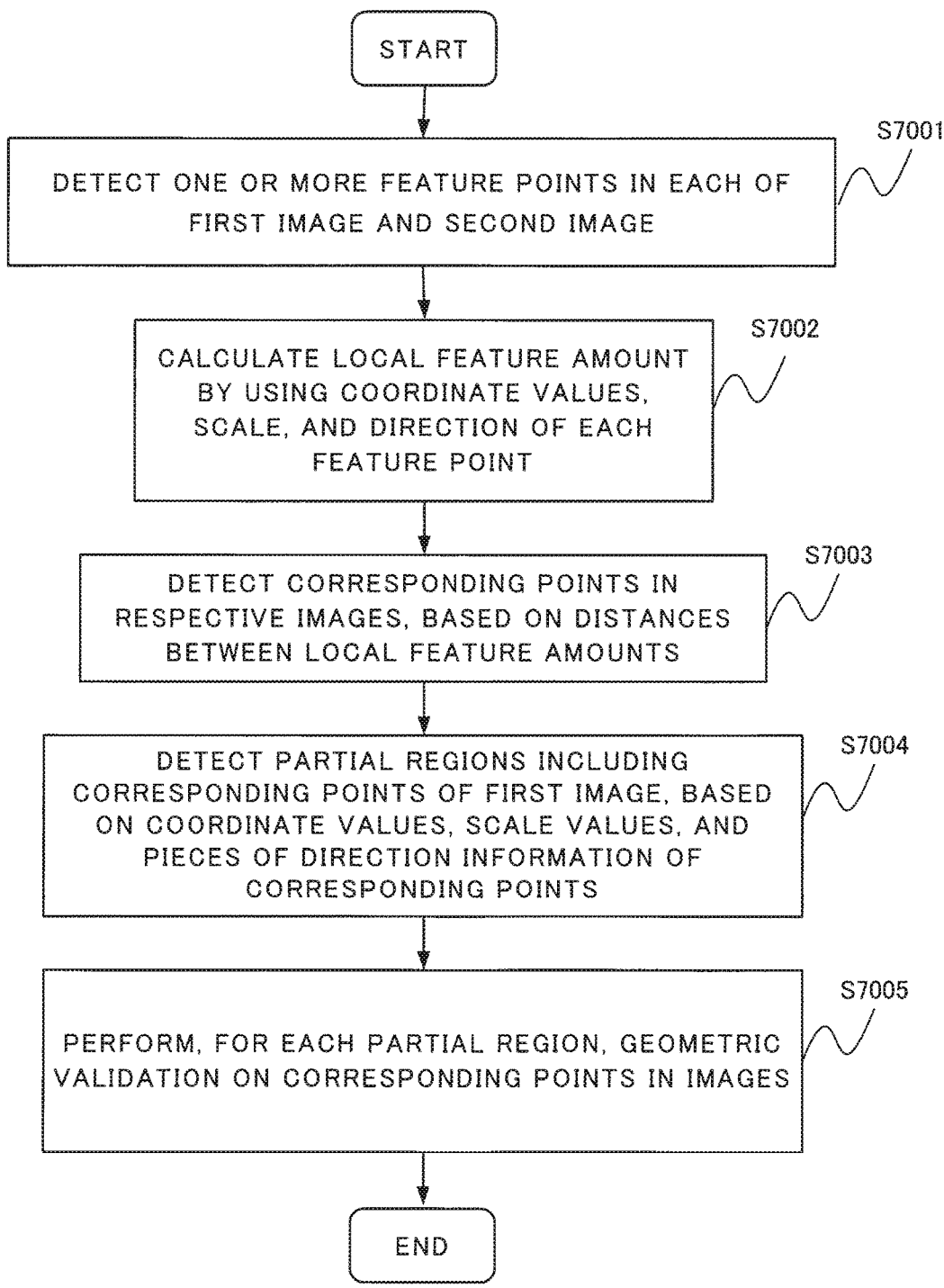
FIG. 19 is a flowchart illustrating an example of a process flow according to the seventh example embodiment.

FIG. 19 is a flowchart illustrating an example of a process flow of the seventh example embodiment. Steps S7001 to S7003 and Step S7005 included in FIG. 19 are similar to Steps S1001 to S1003 and Step S1005 included in FIG. 5, and hence an explanation thereof is omitted.

After the execution of Steps S7001 to S7003 in FIG. 19, the partial region detection unit 701 detects partial regions including the corresponding points of the first image, on the basis of the coordinate values, the scale values, and the pieces of direction information of the corresponding points (Step S7004). Thereafter, the process advances to Step S7005.

According to the image processing device 70 of the seventh example embodiment of the present invention, similar advantageous effects as those of the fourth example embodiment are obtained. In addition, partial regions are detected by using the coordinate values, the scale values, and pieces of direction information of the corresponding points in the seventh example embodiment, which improves the accuracy in detecting the partial regions in comparison with the fourth example embodiment. Hence, it is possible to improve the accuracy in identifying objects in comparison with the fourth example embodiment.

Example Embodiment 8

Figure 20:
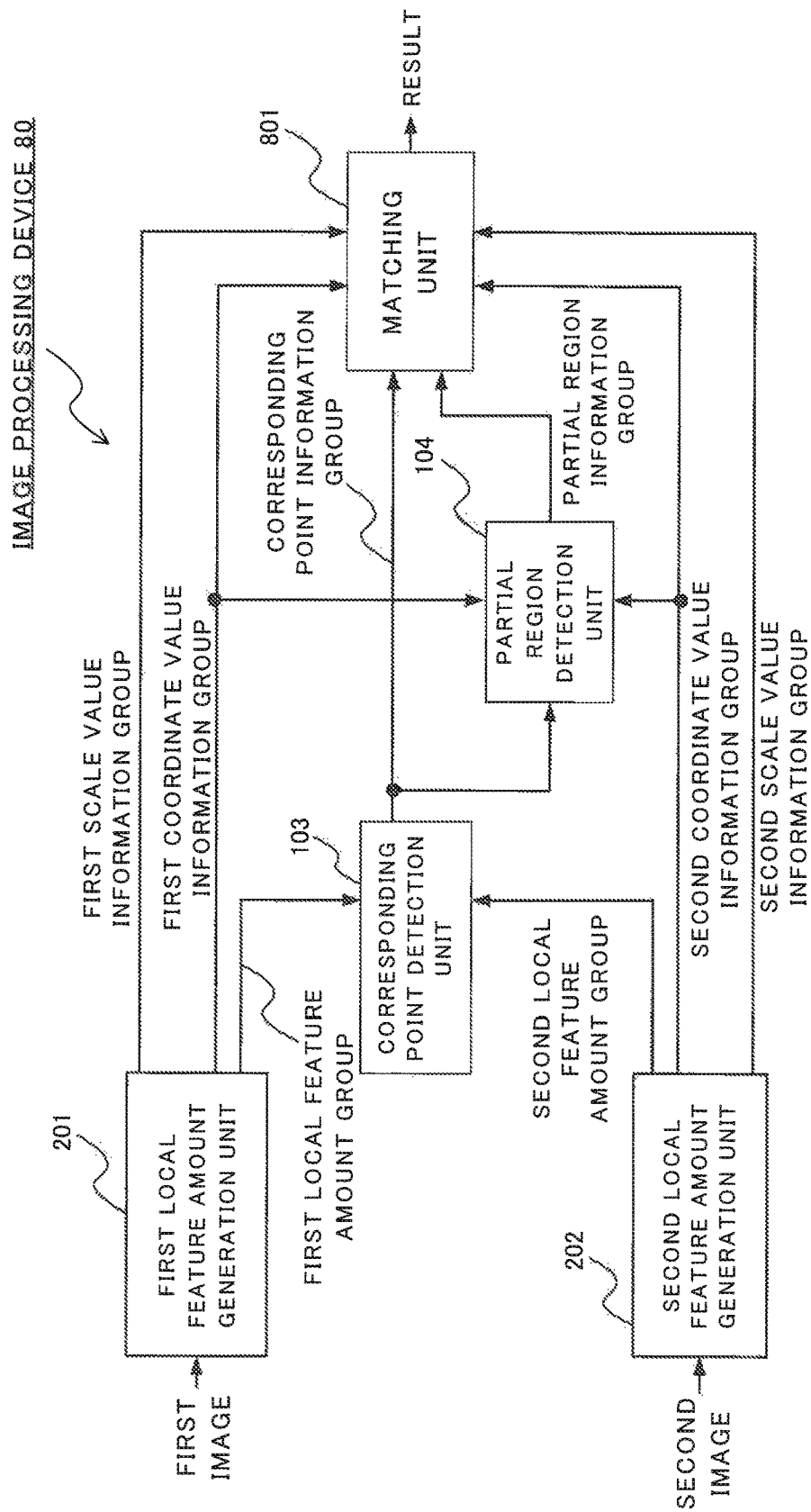
FIG. 20 is a block diagram illustrating an example of an image processing device according to an eighth example embodiment of the present invention.

FIG. 20 is a block diagram illustrating an example of an image processing device according to an eighth example embodiment of the present invention. An image processing device 80 of the eighth example embodiment determines, for each of the partial region, whether or not the same or similar objects are included in images, by using the coordinate values and the scale values of feature points.

The image processing device 80 of the eighth example embodiment includes the first local feature amount calculation unit 201, the second local feature amount calculation unit 202, the corresponding point detection unit 103, the partial region detection unit 104, and a matching unit 801. Operations of the matching unit 801 are partially different from those of the above-described example embodiments.

The first local feature amount calculation unit 201 and the second local feature amount calculation unit 202 are similar to the components in the second example embodiment. Note that, in this example embodiment, the first local feature amount calculation unit 201 outputs a first coordinate value information group to the partial region detection unit 104 and the matching unit 801, and a first scale value information group to the matching unit 801. Similarly, the second local feature amount calculation unit 202 outputs a second coordinate value information group to the partial region detection unit 104 and the matching unit 801 and outputs a second scale value information group to the matching unit 801.

The matching unit 801 determines whether or not the same or similar objects are included in images, by using the first coordinate value information group and the first scale value information group output by the first local feature amount calculation unit 201, the second coordinate value information group and the second scale value information group output by the second local feature amount calculation unit 202, a corresponding point information group output by the corresponding point detection unit 103, and a partial region information group output by the partial region detection unit 104.

Specifically, for example, the matching unit 801 performs, for each partial region, geometric validation on the corresponding points of the images only by using the coordinate values of the corresponding points having similar relative scales, among the corresponding points included in the partial region. The matching unit 801 then determines whether or not the objects in the images are the same or similar, on the basis of the total number of the corresponding points each having geometric match.

The matching unit 801 may determine whether or not the relative scales of corresponding points are similar, in a similar manner to that of the partial region detection unit 203, for example.

In the execution of geometric validation, the matching unit 801 may assume that the geometric relationship between the corresponding points of the images having similar relative scales corresponds to similarity transformation, and then estimate a geometric transformation model indicating the geometric relationship by using a robust estimation method, for example. The matching unit 801 may then determine whether the pair of the corresponding point of the first image and the corresponding point of the second image match the estimated geometric transformation model. The matching unit 801 may employ, for example, a similar method to that of the matching unit 105, as a robust estimation method.

The matching unit 801 may determine whether or not the objects in the images are the same or similar, on the basis of the ratio between the number of pairs of the corresponding points each having geometric match and the number of pairs of the corresponding points not having geometric match.

The first local feature amount calculation unit 201, the second local feature amount calculation unit 202, the corresponding point detection unit 103, the partial region detection unit 104, and the matching unit 801 may be implemented by a CPU of a computer that operates in accordance with an image processing program, for example. In this case, the CPU may read the image processing program from a recording medium storing the program and operate as each of the above-described components in accordance with the program.

Figure 21:
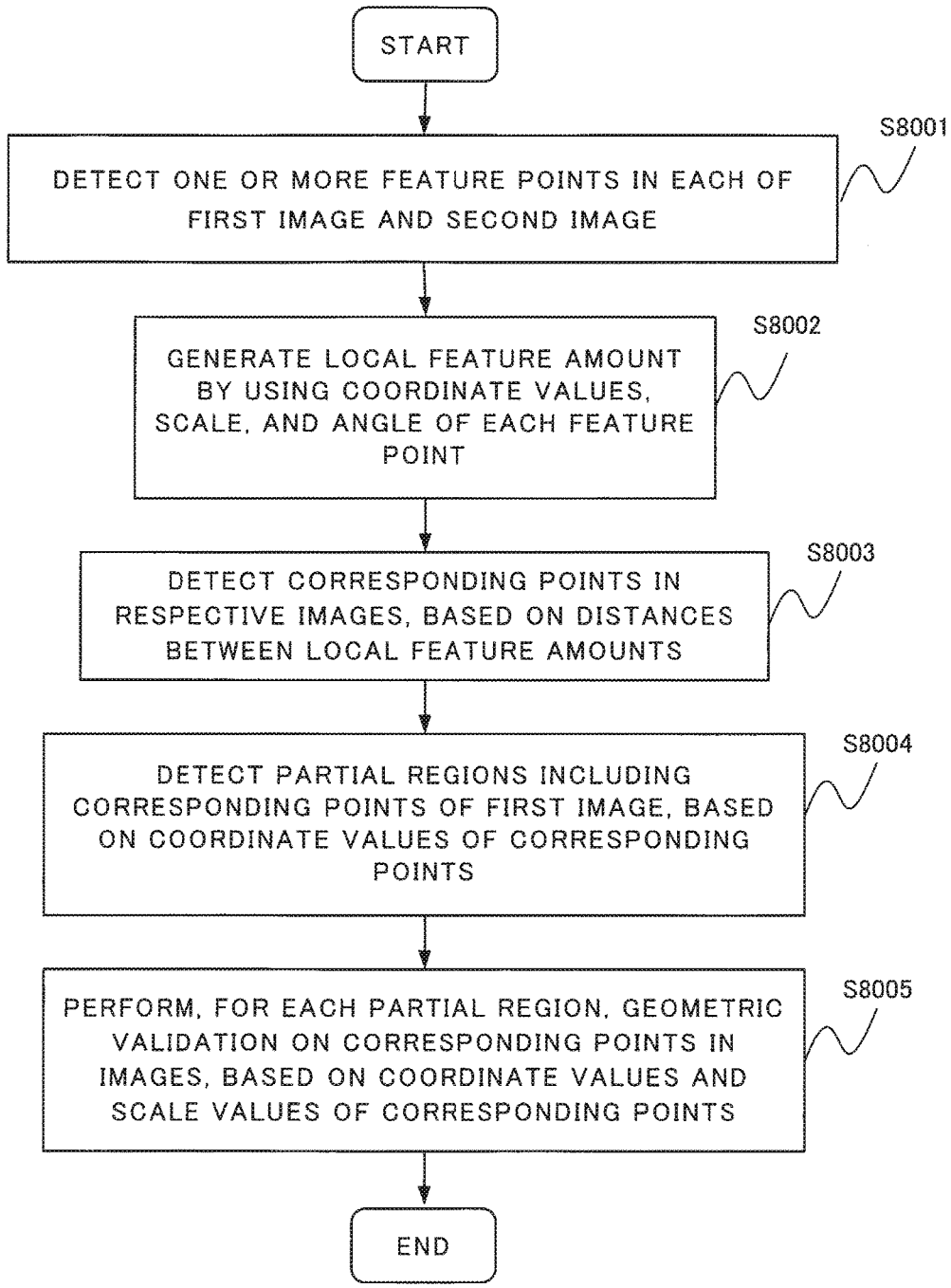
FIG. 21 is a flowchart illustrating an example of a process flow according to the eighth example embodiment.

FIG. 21 is a flowchart illustrating an example of a process flow of the eighth example embodiment. Steps S8001 to S8004 in FIG. 21 are similar to Steps S1001 to S1004 included in FIG. 5, and hence an explanation thereof is omitted.

After the execution of Steps S8001 to S8004 in FIG. 21, the matching unit 801 performs, for each partial region, geometric validation on the corresponding points of the images on the basis of the coordinate values and the scale values of the corresponding points, and identifies similar or the same objects in the images on the basis of the total number of corresponding points each having geometric match (Step 8005).

According to the image processing device 80 of the eighth example embodiment of the present invention, similar advantageous effects as those of the first example embodiment are obtained. In addition, in the eighth example embodiment, whether or not objects in images are the same or similar, is determined on the basis of the coordinate values and the scale values of the corresponding points only by using the coordinate values of the corresponding points having similar relative scales, that is, only by using the feature points corresponding to those of the first image and the second image that are associated correctly. Hence, according to the image processing device 80 of this example embodiment, it is possible to improve accuracy in determining geometric matching of the corresponding points in comparison with the first example embodiment. As a result, it is possible to improve the accuracy in identifying objects in comparison with the first example embodiment.

Example Embodiment 9

Figure 22:
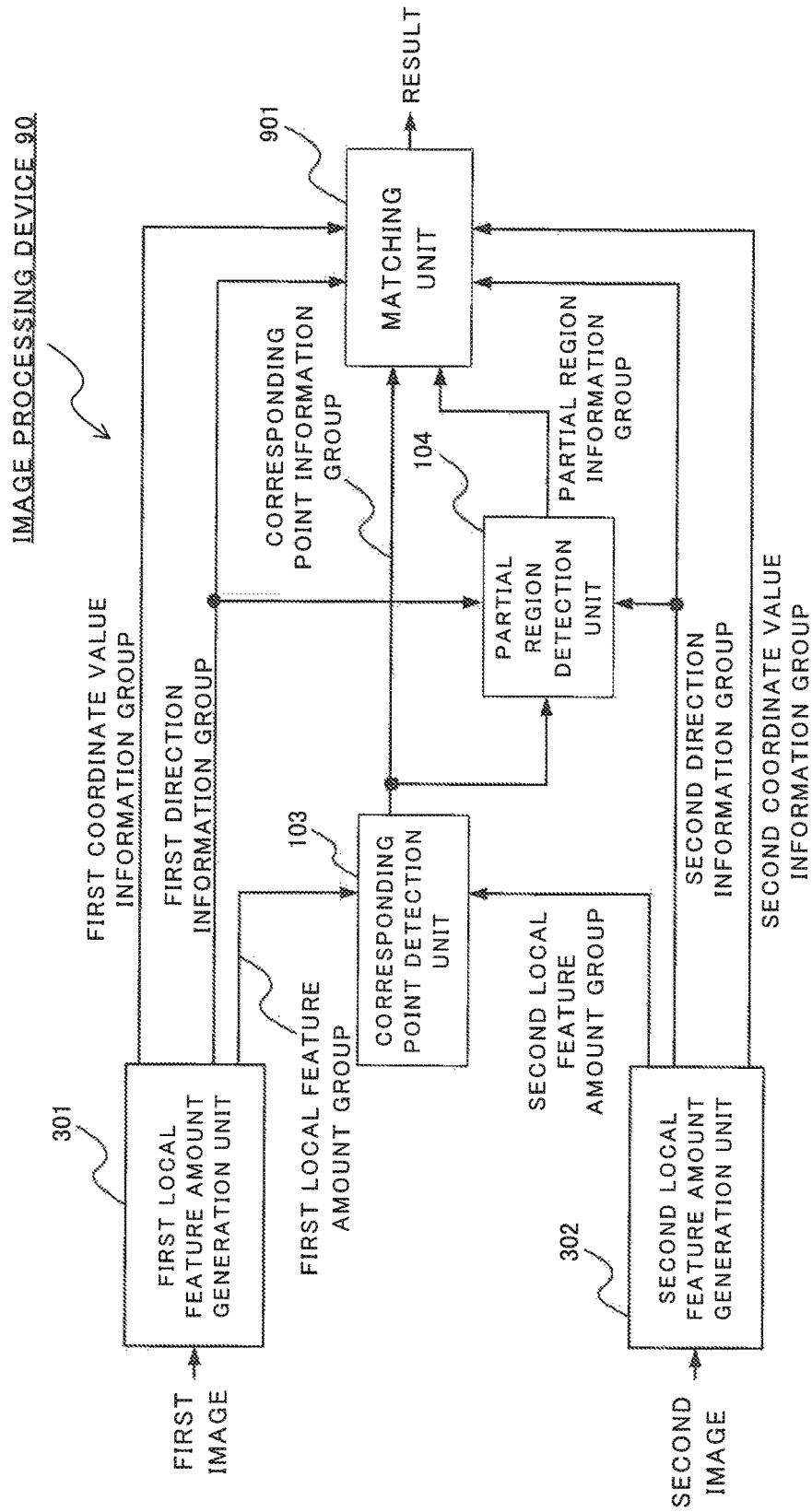
FIG. 22 is a block diagram illustrating an example of an image processing device according to a ninth example embodiment of the present invention.

FIG. 22 is a block diagram illustrating an example of an image processing device according to a ninth example embodiment of the present invention. An image processing device 90 of the ninth example embodiment determines, for each partial region, whether or not the same or similar objects are included in images by using the coordinate values and pieces of direction information of feature points.

The image processing device 90 of the ninth example embodiment includes the first local feature amount calculation unit 301, the second local feature amount calculation unit 302, the corresponding point detection unit 103, the partial region detection unit 104, and a matching unit 901. Operations of the matching unit 901 are partially different from those of the above-described example embodiments.

The first local feature amount calculation unit 301 and the second local feature amount calculation unit 302 are similar to the components in the third example embodiment. Note that, in this example embodiment, the first local feature amount calculation unit 301 outputs a first coordinate value information group to the partial region detection unit 104 and the matching unit 901 and a first direction information group to the matching unit 901. Similarly, the second local feature amount calculation unit 302 outputs a second coordinate value information group to the partial region detection unit 104 and the matching unit 901 and a second direction information group to the matching unit 901.

The matching unit 901 determines whether or not the same or similar objects are included in images, by using the first coordinate value information group and the first direction information group output by the first local feature amount calculation unit 301, the second coordinate value information group and the second direction information group output by the second local feature amount calculation unit 302, a corresponding point information group output by the corresponding point detection unit 103, and a partial region information group output by the partial region detection unit 104.

Specifically, for example, the matching unit 901 performs, for each partial region, geometric validation on the corresponding points of the images only by using the coordinate values of the corresponding points having similar relative directions among the corresponding points included in the partial region. The matching unit 901 then determines whether or not the objects in the images are the same or similar, on the basis of the total number of corresponding points each having geometric match.

The matching unit 901 may determine whether the relative directions of corresponding points are similar, in a similar manner to that of the partial region detection unit 303, for example.

In the execution of geometric validation, the matching unit 901 may assume that the geometric relationship between the corresponding points of the images having similar relative directions corresponds to similarity transformation and then estimate a geometric transformation model indicating the geometric relationship by using a robust estimation method, for example. The matching unit 901 may then determine whether the pair of the corresponding point of the first image and the corresponding point of the second image match the estimated geometric transformation model. The matching unit 901 may employ, for example, a similar method to that of the matching unit 105 as a robust estimation method.

The matching unit 901 may determine whether or not the objects in the images are the same or similar, on the basis of the ratio between the number of pairs of the corresponding points each having geometric match and the number of pairs of the corresponding points not having geometric match.

The first local feature amount calculation unit 301, the second local feature amount calculation unit 302, the corresponding point detection unit 103, the partial region detection unit 104, and the matching unit 901 may be implemented by a CPU of a computer that operates in accordance with an image processing program, for example. In this case, the CPU may read the image processing program from a recording medium storing the program and operate as each of the above-described components in accordance with the program.

Figure 23:
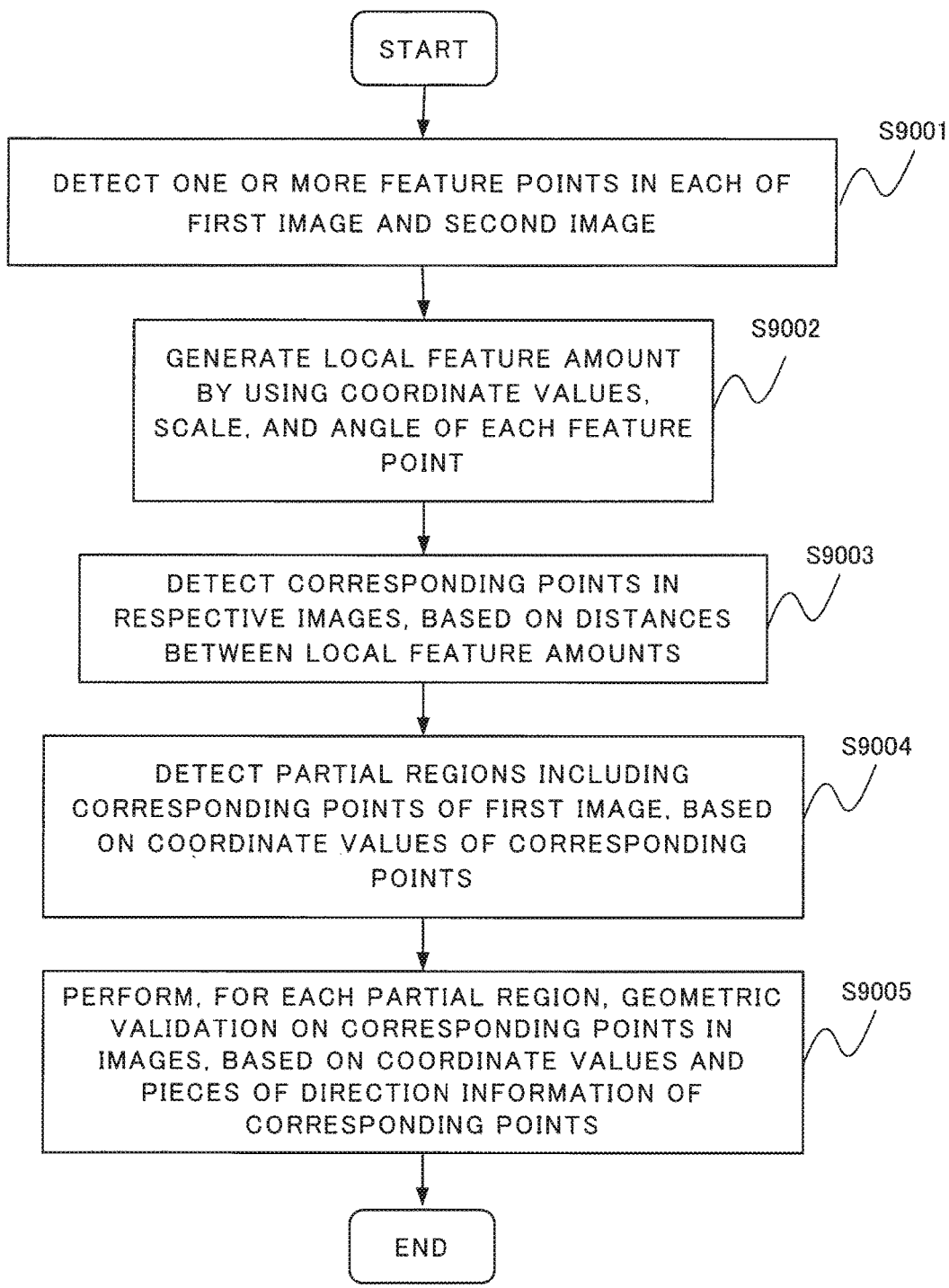
FIG. 23 is a flowchart illustrating an example of a process flow according to the ninth example embodiment.
Figure 24:
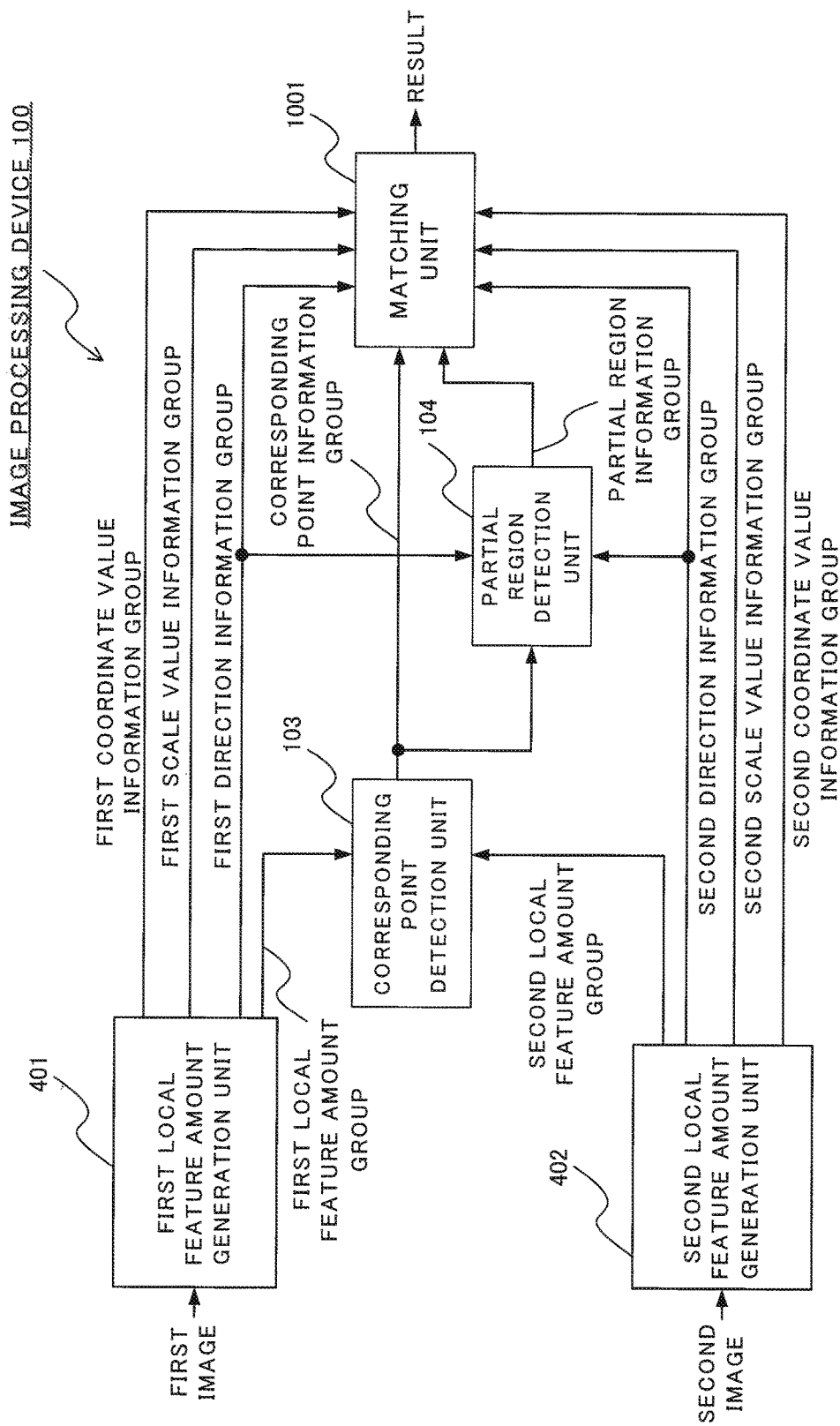
FIG. 24 is a block diagram illustrating an example of an image processing device according to a tenth example embodiment of the present invention.

FIG. 23 is a flowchart illustrating an example of a process flow of the ninth example embodiment. Steps S9001 to S9004 in FIG. 23 are similar to Steps S1001 to S1004 included in FIG. 5, and hence an explanation thereof is omitted.

After the execution of Steps S9001 to S9004 in FIG. 23, the matching unit 901 performs, for each partial region, geometric validation on the corresponding points of the images on the basis of the coordinate values and pieces of direction information of the corresponding points, and identifies similar or the same objects in the images on the basis of the total number of corresponding points each having geometric match (Step 9005)

According to the image processing device 90 of the ninth example embodiment of the present invention, similar advantageous effects as those of the first example embodiment are obtained. In addition, in the ninth example embodiment, whether or not objects in images are the same or similar is determined on the basis of the coordinate values and pieces of direction information of the corresponding points only by using the coordinate values of the corresponding points having similar relative directions, that is, only by using the feature points corresponding to those of the first image and the second image that are associated correctly. Hence, according to the image processing device 90 of this example embodiment, it is possible to improve accuracy in determining geometric matching of the corresponding points in comparison with the first example embodiment. As a result, it is possible to improve the accuracy in identifying objects in comparison with the first example embodiment.

Example Embodiment 10

Figure 25:
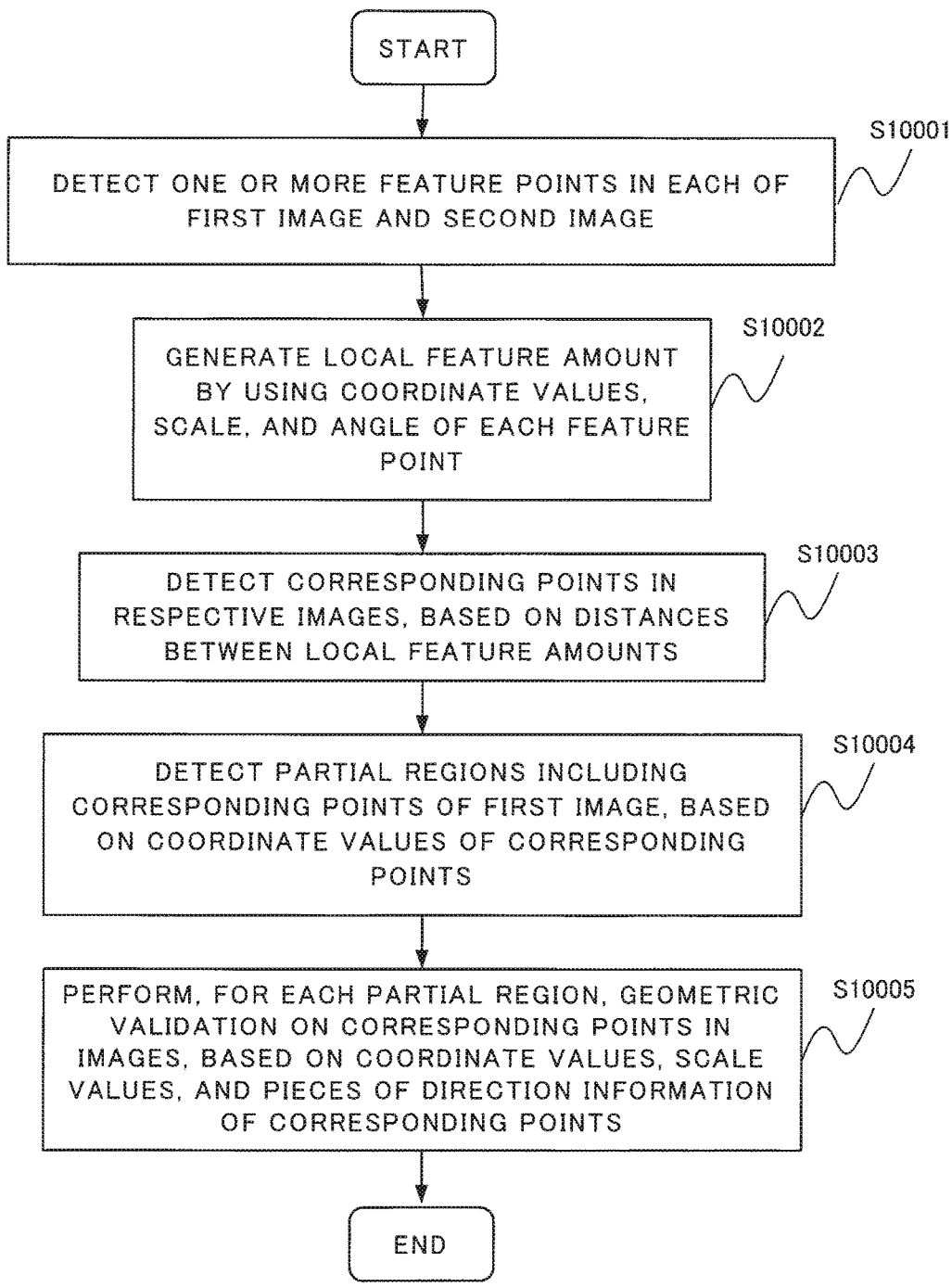
FIG. 25 is a flowchart illustrating an example of a process flow according to the tenth example embodiment.

FIG. 25 is a block diagram illustrating an example of an image processing device according to a tenth example embodiment of the present invention. An image processing device 100 of the tenth example embodiment determines, for each partial region, whether or not the same or similar objects are included in images by using the coordinate values, scale values, and pieces of direction information of feature points.

The image processing device 100 of the tenth example embodiment includes the first local feature amount calculation unit 401, the second local feature amount calculation unit 402, the corresponding point detection unit 103, the partial region detection unit 104, and a matching unit 1001. Operations of the matching unit 1001 are partially different from those of the above-described example embodiments.

The first local feature amount calculation unit 401 and the second local feature amount calculation unit 402 are similar to the components in the fourth example embodiment. Note that, in this example embodiment, the first local feature amount calculation unit 401 outputs the first coordinate value information group to the partial region detection unit 104 and the matching unit 1001 and the first scale value information group and a first direction information group to the matching unit 1001. Similarly, the second local feature amount calculation unit 402 outputs the second coordinate value information group to the partial region detection unit 104 and the matching unit 1001 and the second scale value information group and a second direction information group to the matching unit 1001.

The matching unit 1001 determines whether or not the same or similar objects are included in images, by using the first coordinate value information group, the scale-value information group, and the first direction information group output by the first local feature amount calculation unit 401, the second coordinate value information group, the scale value information group, and the second direction information group output by the second local feature amount calculation unit 402, the corresponding point information group output by the corresponding point detection unit 103, and the partial region information group output by the partial region detection unit 104.

Specifically, for example, the matching unit 1001 performs, for each partial region, geometric validation on the corresponding points of the images only by using the coordinate values of the corresponding points having similar relative scales and similar relative directions among the corresponding points included in the partial region. The matching unit 1001 then determines whether or not the objects in the images are the same or similar, on the basis of the total number of corresponding points each having geometric match.

The matching unit 1001 may determine whether the relative scales and the relative directions of corresponding points are similar, in a similar manner to that of the partial region detection unit 403, for example.

In the execution of geometric validation, the matching unit 1001 may assume that the geometric relationship between the corresponding points of the images having similar relative scales and similar relative directions corresponds to similarity transformation and then estimate a geometric transformation model indicating the geometric relationship, by using a robust estimation method, for example. The matching unit 1001 may then determine whether the pair of the corresponding point of the first image and the corresponding point of the second image match the estimated geometric transformation model. The matching unit 1001 may employ, for example, a similar method to that of the matching unit 105, as a robust estimation method.

The matching unit 1001 may determine whether or not the objects in the images are the same or similar, on the basis of the ratio between the number of pairs of the corresponding points each having geometric match and the number of pairs of the corresponding points not having geometric match.

The first local feature amount calculation unit 401, the second local feature amount calculation unit 402, the corresponding point detection unit 103, the partial region detection unit 104, and the matching unit 1001 may be implemented by a CPU of a computer that operates in accordance with an image processing program, for example. In this case, the CPU may read the image processing program from a recording medium storing the program and operate as each of the above-described components in accordance with the program.

FIG. 25 is a flowchart illustrating an example of a process flow of the tenth example embodiment. Steps S10001 to S10004 in FIG. 25 are similar to Steps S1001 to S1004 included in FIG. 5, and hence an explanation thereof is omitted.

After the execution of Steps S10001 to S10004 in FIG. 25, the matching unit 1001 performs, for each partial region, geometric validation on the corresponding points of the images on the basis of the coordinate values, scale values, and pieces of direction information of the corresponding points. The matching unit 1001 then identifies the same or similar objects in the images on the basis of the total number of corresponding points each having geometric match (Step 10005).

According to the image processing device 100 of the tenth example embodiment of the present invention, similar advantageous effects as those of the first example embodiment are obtained. In addition, in the tenth example embodiment, whether or not objects in images are the same or similar is determined on the basis of the coordinate values, scale values, and pieces of direction information of the corresponding points only by using the coordinate values of the corresponding points having similar relative scales and similar relative directions, that is, only by using the feature points corresponding to those of the first image and the second image that are associated correctly. Hence, according to the image processing device 100 of this example embodiment, it is possible to improve accuracy in determining geometric matching of the corresponding points in comparison with the first example embodiment. As a result, it is possible to improve the accuracy in identifying objects in comparison with the first example embodiment.

The above explanation of the present invention describes a case in which the partial region detection unit detects partial regions in the first image. However, the partial region detection unit in each of the example embodiments may detect partial regions in the second image.

Figure 26:
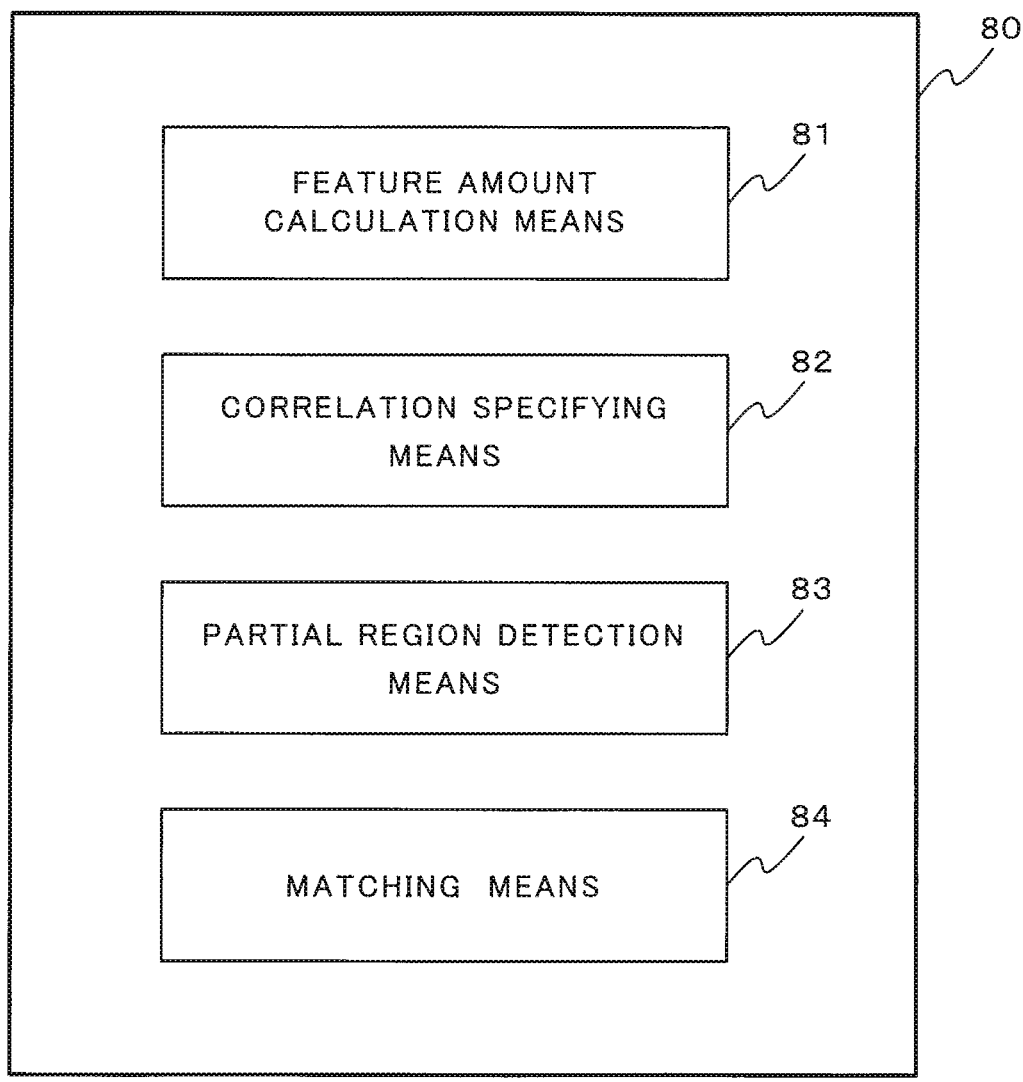
FIG. 26 is a schematic diagram illustrating an example of a minimum configuration of the image processing device according to the present invention.

Next, an explanation is given of an example of the minimum configuration of the image processing device of the present invention. FIG. 26 is a schematic diagram illustrating the example of the minimum configuration of the image processing device of the present invention. The image processing device 80 of the present invention includes a feature amount calculation means 81, a correlation identifying means 82, a partial region detection means 83, and a matching means 84.

The feature amount calculation means 81 (for example, the first local feature amount calculation unit 11, 101, 201, 301, or 401) detects feature points in an image and calculates, for each feature point, the local feature amount of the feature point on the basis of a peripheral region including the feature point.

The correlation identifying means 82 (for example, the corresponding point detection unit 13 or 103) identifies the correlation between each feature point of the first image and each feature point of the second image on the basis of the local feature amount of the feature point of the first image and the local feature amount of the feature point of the second image.

The partial region detection means 83 (for example, the partial region detection unit 14, 104, 203, 303, 403, 501, 601, or 701) detects, in one of the first image and the second image, a partial region including one of the feature points of the image.

The matching means 84 (for example, the matching unit 15 or 105) determines, for each partial region, whether or not an object in the first image and an object in the second image are the same or similar, on the basis of feature points included in the partial region and the feature points corresponding to the feature points.

With such a configuration, it is possible to suppress a decrease of accuracy in identifying objects even when the objects are different in shape in the images.

The partial region detection means 83 may have a configuration of detecting partial regions on the basis of the coordinate values of the feature points.

The partial region detection means 83 may have a configuration of detecting partial regions on the basis of a first scale value information group, which is a set of pieces of size information of the peripheral regions corresponding to the feature points of the first image, and a second scale value information group, which is a set of pieces of size information of the peripheral regions corresponding to the feature points of the second image.

The partial region detection means 83 may have a configuration of detecting partial regions on the basis of a first direction information group, which is a set of the pieces of direction information corresponding to the feature points of the first image and a second direction information group, which is a set of the pieces of direction information corresponding to the feature points of the second image.

The partial region detection means 83 may have a configuration of transforming the coordinates of each feature point of the image for which a partial region is to be detected, by using the size information and direction information of the peripheral region corresponding to the feature point, the coordinates of the feature point of the other image corresponding to the feature point, and the size information and direction information of the peripheral region corresponding to the feature point of the other image corresponding to the feature point.

INDUSTRIAL APPLICABILITY

The present invention is preferably applied to an image processing device configured to determine whether or not objects in different images are the same or similar.

The invention of the present application is described above with reference to the example embodiments. However, the invention of the present application is not limited to the above-described example embodiments. Various changes that can be understood by those skilled in the art within the scope of the invention of the present application can be made to the configurations and details of the invention of the present application.

This application claims priority based on Japanese Patent Application No. 2014-095959, filed on May 7, 2014, the entire disclosure of which is incorporated herein.

REFERENCE SIGNS LIST 11, 101, 201, 301, 401 First local feature amount calculation unit
12, 102, 202, 302, 402 Second local feature amount calculation unit
13, 103 Corresponding point detection unit
14, 104, 203, 303, 403, 501, 601, 701 Partial region detection unit
15, 105, 801, 901, 1001 Matching unit
2000 Computer (renumbering needed)
2001 CPU
2002 ROM
2003 RAM
2004 program
2005 Storage device
2006 Recording medium
2007 Driver
2008 Communication interface
2009 Network
2010 Input/output interface
2011 Bus

What is claimed is:
1. An image processing device comprising:
a processor configured to function as:
a local feature amount calculation unit configured to detect feature points in each of a first image and a second image and calculates, for each of the feature points, a local feature amount of the feature point, based on a peripheral region of the feature point, the peripheral region including the feature point;

a correlation identifying unit configured to specify, based on the local feature amount of each of the feature points of the first image and the local feature amount of each of the feature points of the second image, a correlation between the feature point of the first image and the feature point of the second image;

a partial region detection unit configured to detect partial regions including the first image; and a matching unit configured to determine, for each of the partial regions, whether or not an object in the first image and an object in the second image are the same or similar based on the feature points included in the partial region and the feature points of the second image which corresponds to each of the feature points in the partial region;

wherein the partial region detection unit detects partial regions, based on a first scale value information group and a second scale value information group, the first scale value information group being a set of pieces of size information, of peripheral regions corresponding to each of the feature points of the first image, and the second scale value information group being a set of pieces of size information of peripheral regions corresponding to each of the feature points of the second image.

2. The image processing device according to claim 1, wherein the partial region detection unit detects the partial region, based on a coordinate value of each of the feature point in the first image and a coordinate value of each of the feature point in the second image.

3. The image processing device according to claim 1, wherein the partial region detection unit transforms coordinates of the feature point of the first image by using size information and direction information of a peripheral region corresponding to the feature point, coordinates of a feature point of a different image corresponding to the feature point, and size information and direction information of a peripheral region corresponding to the feature point of the different image corresponding to the feature point.

4. The image processing device according to claim 1, wherein the matching unit determines whether or not an object in the first image and an object in the second image are same or similar, based on a first scale value information group, a second scale value information group and pieces of coordinate value information of each of the feature points of both the first image and the second image, the first scale value information group being a set of pieces of size information of peripheral regions corresponding to each of the feature points of the first image and the second scale value information group being a set of pieces of size information of peripheral regions corresponding to each of the feature points of the second image.

5. The image processing device according to claim 1, wherein the matching unit determines whether or not an object in the first image and an object in the second image are same or similar, based on a first direction information group, a second direction information group and coordinate value information of each of the feature points of both the first image and the second image, the first direction information group being a set of pieces of direction information corresponding to each of the feature points of the first image and the second direction information group being a set of pieces of direction information corresponding to each of the feature points of the second image.

6. An image processing device comprising:
a processor configured to function as:
a local feature amount calculation unit configured to detect feature points in each of a first image and a second image and calculates, for each of the feature points, a local feature amount of the feature point, based on a peripheral region of the feature point, the peripheral region including the feature point;

a correlation identifying unit configured to specify, based on the local feature amount of each of the feature points of the first image and the local feature amount of each of the feature points of the second image, a correlation between the feature point of the first image and the feature point of the second image;

a partial region detection unit configured to detect partial regions including the feature points in the first image; and a matching unit configured to determine, for each of the partial regions, whether or not an object in the first image and an object in the second image are the same or similar based on the feature points included in the partial region and the feature points of the second image which corresponds to each of the feature points in the partial region;

wherein the partial region detection unit detects partial regions, based on a first direction information group and a second direction information group, the first direct information group being a set of pieces of direction information corresponding to each of the feature points of the first image, and the second direction information group being a set of pieces of direction information corresponding to each of the feature points of the second image.

7. The image processing device according to claim 6, wherein the partial region detection unit detects the partial region, based on a coordinate value of each of the feature point in the first image and a coordinate value of each of the feature point in the second image.

8. The image processing device according to claim 6, wherein the partial region detection unit transforms coordinates of the feature point of the first image, buy using size information and direction information of a peripheral region corresponding to the feature point, coordinates of a feature point of a different image corresponding to the feature point, and size information and direction information of a peripheral region corresponding to the feature point of the different image corresponding to the feature point.

9. The image processing device according to claim 6, wherein the matching unit determines whether or not an object in the first image and an object in the second image are same or similar, based on a first scale value information group, a second scale information group and coordinate value information of each of the feature points of both the first image and the second image, the first scale value information group being a set of pieces of size information of peripheral regions corresponding to each of the feature points of the first image and the second scale value information group being a set of pieces of size information of peripheral regions corresponding to each of the feature points of the second image.

10. The image processing device according to claim 6, wherein the matching unit determines whether or not an object in the first image and an object in the second image are same or similar, based on a first direction information group, a second direction information group and pieces of coordinate value information of each of the feature points of both the first image and the second image, the first direction information group being a set of pieces of direction information corresponding to each of the feature points of the first image and the second direction information group being a set of pieces of direction information corresponding to each of the feature points of the second image.

11. An image processing method comprising:

detecting feature points in each of a first image and a second image and calculating, for each of the feature points, a local feature amount of the feature point, based on a peripheral region of the feature point, the peripheral region including the feature point;

identifying, based on the local feature amount of each of the feature points of the first image and the local feature amount of each of the feature points of the second image, a correlation between the feature point of the first image and the feature point of the second image;

detecting partial regions including the feature points in the first image based on a first scale value information group and a second scale value information group, the first scale value information group being a set of pieces of size information of peripheral regions corresponding to each of the feature points of the first image, and the second scale value information group being a set of pieces of size information of peripheral regions corresponding to each of the feature points of the second image; and determining, for each of the partial regions, whether or not an object in the first image and an object in the second image are the same or similar, based on the feature points included in the partial region and the feature points of the second image which corresponds to each of the feature points in the partial region.

12. An image processing method comprising:

detecting feature points in each of a first image and a second image and calculating, for each of the feature points, a local feature amount of the feature point, based on a peripheral region of the feature point, the peripheral region including the feature point;

identifying, based on the local feature amount of each of the feature points of the first image and the local feature amount of each of the feature points of the second image, a correlation between the feature point of the first image and the feature point of the second image;

detecting partial regions including the feature points in the first image based on a first direction information group and a second direction information group, the first direction information group being a set of pieces of direction information corresponding to each of the feature points of the first image, and the second direction information group being a set of pieces of direction information corresponding to each of the feature points of the second image; and determining, for each of the partial regions, whether or not an object in the first image and an object in the second image are the same or similar, based on the feature points included in the partial region and the feature points of the second image which corresponds to each of the feature points in the partial region.

* * * * *